US008885050B2

(12) United States Patent
Wang et al.

(10) Patent No.: US 8,885,050 B2
(45) Date of Patent: Nov. 11, 2014

(54) VIDEO QUALITY MONITORING

(75) Inventors: Beibei Wang, Morganville, NJ (US);
Dekun Zou, West Windsor, NJ (US);
Ran Ding, Eatontown, NJ (US); Tao Liu, Eatontown, NJ (US); Sitaram Bhagavathy, Plainsboro, NJ (US);
Niranjan Narvekar, Long Branch, NJ (US); Jeffrey A. Bloom, West Windsor, NJ (US); Glenn L. Cash, Matawan, NJ (US)

(73) Assignee: Dialogic (US) Inc., Parsippany, NJ (US)

( * ) Notice: Subject to any disclaimer, the term of this patent is extended or adjusted under 35 U.S.C. 154(b) by 759 days.

(21) Appl. No.: 13/025,558

(22) Filed: Feb. 11, 2011

(65) Prior Publication Data

US 2012/0206610 A1    Aug. 16, 2012

(51) Int. Cl.
*H04N 17/00*    (2006.01)

(52) U.S. Cl.
CPC .................................. *H04N 17/004* (2013.01)
USPC .................. 348/184; 348/E17.001; 348/180; 348/192; 375/240.01; 375/240.24

(58) Field of Classification Search
CPC .......... H04N 19/002; H04N 19/00127; H04N 19/00169; H04N 19/00242; H04N 19/00933
USPC ........................................ 375/240.01, 240.24
See application file for complete search history.

(56) References Cited

U.S. PATENT DOCUMENTS

| | | | |
|---|---|---|---|
| 6,028,641 A * | 2/2000 | Kim .............................. | 348/537 |
| 6,075,768 A * | 6/2000 | Mishra ......................... | 370/229 |
| 6,822,675 B2 * | 11/2004 | Jung et al. ..................... | 348/180 |
| 2004/0156559 A1 * | 8/2004 | Cheng et al. .................. | 382/286 |
| 2005/0041689 A1 * | 2/2005 | Wu et al. ........................ | 370/477 |
| 2005/0175093 A1 * | 8/2005 | Haskell et al. ............ | 375/240.03 |
| 2005/0190836 A1 * | 9/2005 | Lu et al. .................... | 375/240.03 |
| 2005/0226321 A1 | 10/2005 | Chen | |
| 2008/0089414 A1 * | 4/2008 | Wang et al. .............. | 375/240.13 |
| 2009/0208140 A1 * | 8/2009 | Jayant et al. .................. | 382/309 |

(Continued)

FOREIGN PATENT DOCUMENTS

EP    2018069 A1 *    1/2009

OTHER PUBLICATIONS

ITU-T, "Series G: Transmission Systems and Media, Digital Systems and Networks," International Telecommunication Union, Apr. 2007, Switzerland.

(Continued)

*Primary Examiner* — Behrooz Senfi
*Assistant Examiner* — Maria Vazquez Colon
(74) *Attorney, Agent, or Firm* — Chapin IP Law, LLC

(57) ABSTRACT

Systems and methods of perceptual quality monitoring of video information, communications, and entertainment that can estimate the perceptual quality of video with high accuracy, and can be used to produce quality scores that better correlate with subjective quality scores of an end user. The systems and methods of perceptual quality monitoring of video can generate, from an encoded input video bitstream, estimates of one or more quality parameters relating to the video, such as the coding bit rate parameter, the video frame rate parameter, and the packet loss rate parameter, and provide these video quality parameter estimates to a predetermined video quality estimation model. Because the estimates of the video quality parameters are generated from the encoded input video bitstream as it is being received, the systems and methods are suitable for use as QoE monitoring tools.

24 Claims, 20 Drawing Sheets

(56) References Cited

U.S. PATENT DOCUMENTS

2009/0225170 A1     9/2009  Yamagishi et al.
2009/0262198 A1    10/2009  Yamagishi et al.
2010/0284295 A1*  11/2010  Yamagishi et al. ........... 370/252

OTHER PUBLICATIONS

Joskowicz et al., "Enhancements to the Opinion Model for Video-Telephony Applications," LANC '09, Sep. 2009, Brazil.

* cited by examiner

VIDEO QUALITY MONITORING

CROSS REFERENCE TO RELATED APPLICATIONS

—Not applicable—

STATEMENT REGARDING FEDERALLY SPONSORED RESEARCH OR DEVELOPMENT

—Not applicable—

FIELD OF THE INVENTION

The present application relates generally to systems and methods of monitoring the quality of video information, communications, and entertainment, and more specifically to systems and methods of perceptual quality monitoring of video information, communications, and entertainment that employ International Telecommunication Union-Telecommunication Standardization Sector (ITU-T) Recommendation G.1070 "Opinion model for video-telephony applications."

BACKGROUND OF THE INVENTION

With the proliferation of broadband multimedia access networks, there has been an increasing need for effective ways to monitor the perceptual quality of video information, communications, and entertainment (also referred to herein as a/the "quality of experience" or "QoE"). The International Telecommunication Union-Telecommunication Standardization Sector (ITU-T) has standardized a computational model for estimating such QoE. Known as ITU-T Recommendation G.1070 "Opinion model for video-telephony applications," or the "G.1070 model," this computational model can be employed as a QoE planning tool for use in estimating the effects on QoE of variations in one or more quality parameters, including coding bit rate parameters, video frame rate parameters, packet loss rate parameters, loudness parameters, echo parameters, video resolution parameters, etc. Specifically, the G.1070 model includes three distinct models, namely, a speech quality estimation model, a video quality estimation model, and a multimedia quality integration model. The G.1070 video quality estimation model can be used to estimate the subjective effects on QoE of the quality parameters relating to video, such as the coding bit rate parameter, the video frame rate parameter, the packet loss rate parameter, the video resolution parameter, etc. For example, given assumptions about the coding bit rate, the frame rate, and the packet loss rate, the G.1070 video quality estimation model can be used to generate an estimate, typically in the form of a quality score, of the perceptual quality of the video that is delivered to the end user. Assuming a constant frame rate and a packet loss rate of zero, the G.1070 video quality estimation model typically produces higher quality scores for higher bit rates of compressed video information, and lower quality scores for lower bit rates of compressed video information.

Although the G.1070 model has been successfully employed as a QoE planning tool, the G.1070 model has drawbacks in that its conventional mode of operation is unsuitable for use as a QoE monitoring tool. As discussed above, given assumptions about the coding bit rate and the frame rate of compressed video information, and further, given assumptions about the packet loss rate of an associated video channel, the G.1070 video quality estimation model can generate an estimate in the form of a quality score of the perceptual quality of the video that is delivered to the end user. However, the coding bit rate parameter and the video frame rate parameter employed by the G.1070 video quality estimation model typically represent the coding bit rate and the frame rate, respectively, at which an encoded input video bitstream (also referred to herein as a/the "input bitstream") is to be encoded for playback to the end user. Such coding bit rate parameters and video frame rate parameters employed by the G.1070 video quality estimation model do not generally represent the actual coding bit rate and the actual frame rate, respectively, of the input bitstream prior to decoding. Similarly, the packet loss rate parameter employed by the G.1070 video quality estimation model does not generally represent the actual packet loss rate of the video channel carrying the input bitstream, but instead typically represents the expected packet loss rate of the video channel to be used to deliver the video to the end user. Although information about the actual coding bit rate, the actual frame rate, and the actual packet loss rate of input bitstreams is generally not employed in QoE planning applications, such information can be useful for monitoring the QoE of transcoded bitstreams. Moreover, although the G.1070 model is generally suitable for estimating aspects of the perceptual quality of video that are related to the network, such as the expected packet loss rate, information about the content of the video is generally not considered in the G.1070 video quality estimation model. For example, a video scene may include a relatively complex background with a high level of motion, whereas the next subsequent video scene may include a relatively simple background with little or no motion. Each video frame of the next subsequent video scene may therefore be readily predictable from a reference video frame, and the coding bit rate required to achieve high quality coding of the next subsequent video scene may be relatively low. However, because the G.1070 video quality estimation model typically produces lower quality scores for lower bit rates of compressed video information, the G.1070 model may produce a relatively low quality score for the next subsequent video scene, notwithstanding the fact that the perceptual quality of that video scene may actually be high, perhaps even higher than the perceptual quality of the video scene that preceded it. Moreover, another such video scene may be a very complex video scene, but the instantaneous coding bit rate required to represent the complex video scene with high quality may exceed the capabilities of the video channel and/or the video decoder. In that case, a bit rate control algorithm implemented in the video encoder may operate to limit the coding bit rate at a relatively high level, but not high enough to assure high quality coding of the complex video scene. Because the G.1070 video quality estimation model typically produces higher quality scores for higher bit rates of compressed video information, the G.1070 model may produce a relatively high quality score for the complex video scene, even though the perceptual quality of that video scene may actually be low. Accordingly, in certain cases, the G.1070 video quality estimation model may either underestimate or overestimate the perceptual quality of video scenes, disadvantageously producing quality scores that may not correlate well with subjective quality scores of the end user.

It would therefore be desirable to have systems and methods of perceptual quality monitoring of video information, communications, and entertainment that avoid at least some of the drawbacks of the G.1070 model discussed above.

BRIEF SUMMARY OF THE INVENTION

In accordance with the present application, systems and methods of perceptual quality monitoring of video information, communications, and entertainment are disclosed that can estimate the perceptual quality of video with high accuracy, and can therefore be used to produce quality scores that better correlate with subjective quality scores of an end user. Such systems and methods of perceptual quality monitoring of video can generate, from an encoded input video bitstream, estimates of one or more quality parameters relating to video, such as the coding bit rate parameter, the video frame rate parameter, and the packet loss rate parameter, and provide these video quality parameter estimates to a predetermined video quality estimation model. Because the estimates of the video quality parameters are generated from the encoded input video bitstream as it is being received, the disclosed systems and methods are suitable for use as QoE monitoring tools.

In accordance with one aspect, a system for perceptual quality monitoring of video information, communications, and entertainment (also referred to herein as a/the "perceptual quality monitoring system") includes a data collection component, a parameter estimation component, and a video quality estimation component. For example, the video quality estimation component can be configured to implement the G.1070 video quality estimation model, or any other suitable video quality estimation model. The data collection component can be operative to receive an encoded input video bitstream (also referred to herein as a/the "input bitstream") including a plurality of video frames, and to provide the input bitstream to the parameter estimation component, which includes a feature collection component and a parameter estimation sub-component. The parameter estimation component is operative to extract predetermined information from the input bitstream, including, but not limited to, the number of bits received, the number of packets received, and the number of packets lost for a predetermined number, N, of video frames (also referred to herein as a/the "segment of N video frames"). In accordance with one exemplary aspect, the perceptual quality monitoring system effectively slides a window (also referred to herein as a/the "sliding window") over portions of data from the input bitstream to determine the number of bits received, the number of packets received, and the number of packets lost, for each successive segment of N video frames in the input bitstream. Using the predetermined information extracted from the input bitstream, the feature collection component can determine the number of packets received in the respective segment of N video frames (also referred to herein as a/the "packetReceivedCount"), the number of packets received per video frame (also referred to herein as a/the "packetsPerPicture"), the number of bits received in the respective segment of N video frames (also referred to herein as a/the "bitsReceivedCount"), the number of packets lost in the respective segment of N video frames (also referred to herein as a/the "packetLostCount"), the time interval between two adjacent video frames (also referred to herein as a/the "timeIncrement"), and the reference clock frequency (also referred to herein as a/the "timescale"). The feature collection component is further operative to provide indications of at least the packetReceivedCount, the packetsPerPicture, the bitsReceivedCount, the packetLostCount, the timeIncrement, and the timescale to the parameter estimation sub-component, which includes a packet loss rate estimation component, a bit rate estimation component, and a frame rate estimation component. Using the packetReceivedCount and the packetLostCount, the packet loss rate estimation component can generate at least an estimate of the packet loss rate parameter for the respective segment of N video frames. Further, using the timeIncrement and the timescale, the frame rate estimation component can generate at least an estimate of the video frame rate parameter for the respective segment of N video frames. Moreover, using the bitsReceivedCount, the packetsPerPicture, the estimate of the packet loss rate parameter, and the estimate of the video frame rate parameter, the bit rate estimation component can generate at least an estimate of the coding bit rate parameter for the respective segment of N video frames. The parameter estimation component is operative to provide indications of at least the estimate of the packet loss rate parameter, the estimate of the video frame rate parameter, and the estimate of the coding bit rate parameter, to the video quality estimation component, which uses the respective video quality parameter estimates to generate at least an estimate of the perceptual quality of the video that is delivered to the end user.

In accordance with another aspect, to increase the accuracy of the estimate of the perceptual quality of the video that is delivered to the end user, the perceptual quality monitoring system is operative to normalize the estimate of the coding bit rate parameter generated by the bit rate estimation component, taking into account the complexities of the video frames included in the input bitstream. In accordance with this additional aspect, the perceptual quality monitoring system further includes a video frame complexity estimation component, and a bit rate normalization component. Moreover, the parameter estimation component within the perceptual quality monitoring system is further operative to extract, for each video frame in the input bitstream, at least the number of coded macroblocks, the number of coded bits, and the quantization level. Using the number of coded macroblocks, the number of coded bits, and the quantization level, the video frame complexity estimation component can generate at least an estimate of the complexity of the respective video frames (also referred to herein as a/the "frame complexity"), and to provide an indication of the frame complexity to the bit rate normalization component, which uses the frame complexity to generate a normalized estimate of the coding bit rate parameter. The video quality estimation component uses the estimate of the packet loss rate parameter, the estimate of the video frame rate parameter, and the normalized estimate of the coding bit rate parameter, to generate at least an estimate of the perceptual quality of the video that is delivered to the end user with increased accuracy.

In QoE monitoring applications, the actual values of the coding bit rate and the frame rate of an encoded input video bitstream, and the actual packet loss rate of an associated video channel, are generally not assumed as in QoE planning applications, but instead are estimated. By generating such estimates of one or more of the coding bit rate, frame rate, and packet loss rate parameters from the encoded input video bitstream as it is being received, and providing these video quality parameter estimates to a predetermined video quality estimation model, the disclosed systems and methods of perceptual quality monitoring of video can beneficially provide the heretofore unavailable functionality of a QoE monitoring tool. Moreover, by normalizing the video quality parameter relating to the coding bit rate, taking into account the complexities of the video frames included in the input bitstream, the disclosed systems and methods can advantageously generate estimates of the perceptual quality of the video delivered to the end user with increased accuracy.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Systems and methods of perceptual quality monitoring of video information, communications, and entertainment are provided that can estimate the perceptual quality of video with high accuracy, and can therefore be used to produce quality scores that more closely match the actual perceptual quality of such video, as perceived by an end user. Such systems and methods of perceptual quality monitoring of video can generate, from an encoded input video bitstream, estimates of one or more quality parameters relating to video, such as the coding bit rate parameter, the video frame rate parameter, and the packet loss rate parameter, and provide these video quality parameter estimates to a predetermined video quality estimation model. Because the estimates of the video quality parameters are generated from the encoded input video bitstream as it is being received, the disclosed systems and methods are suitable for use as QoE monitoring tools.

Figure 1:
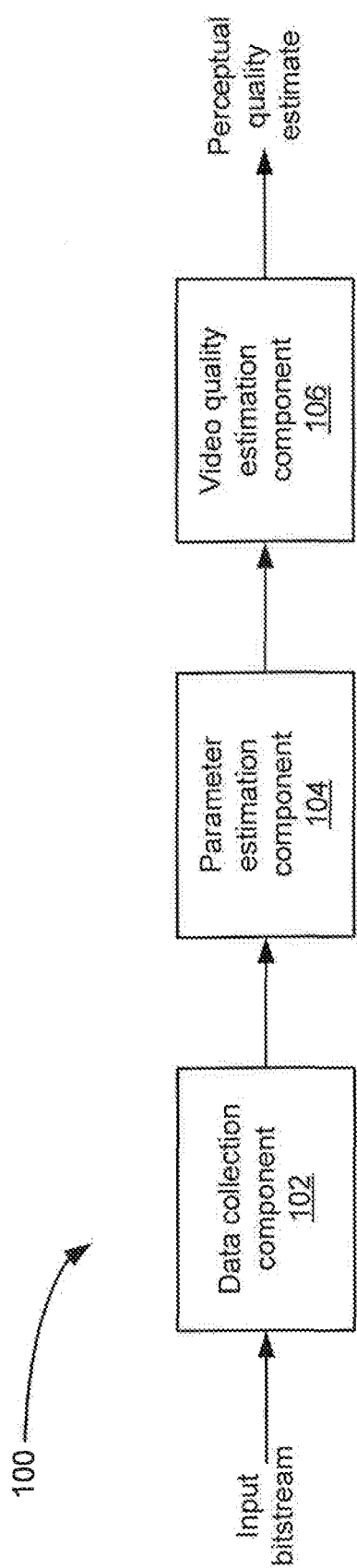
FIG. 1 is a block diagram of an exemplary perceptual quality monitoring system, including an exemplary data collection component, an exemplary parameter estimation component, and an exemplary video quality estimation component, in accordance with an exemplary embodiment of the present application.

FIG. 1 depicts an illustrative embodiment of an exemplary perceptual quality monitoring system 100, in accordance with the present application. As shown in FIG. 1, the perceptual quality monitoring system 100 includes a data collection component 102, a parameter estimation component 104, and a video quality estimation component 106. For example, the video quality estimation component 106 can be configured to implement the G.1070 video quality estimation model, as described in International Telecommunication Union-Telecommunication Standardization Sector (ITU-T) Recommendation G.1070 "Opinion model for video-telephony applications" (also referred to herein as the "G.1070 model"), or any other suitable video quality estimation model. The data collection component 102 is operative to receive an encoded input video bitstream (also referred to herein as a/the "input bitstream") including a plurality of video frames, and to provide the input bitstream to the parameter estimation component 104. The parameter estimation component 104 is operative to extract predetermined information from the input bitstream, including, but not limited to, the number of bits received, the number of packets received, and the number of packets lost for a predetermined number, N, of video frames (also referred to herein as a/the "segment of N video frames"). For example, the predetermined number, N, of video frames may be equal to 30, or any other suitable number. In accordance with the illustrative embodiment of FIG. 1, the perceptual quality monitoring system 100 effectively slides a window (also referred to herein as a/the "sliding window") over portions of data from the input bitstream to determine the number of bits received, the number of packets received, and the number of packets lost, for each successive segment of N video frames in the input bitstream. Using the predetermined information extracted from the input bitstream, the parameter estimation component 104 can generate estimates of one or more video quality parameters associated with the input bitstream, including, but not limited to, an estimate of the packet loss rate parameter, an estimate of the video frame rate parameter, and an estimate of the coding bit rate parameter. The parameter estimation component 104 is operative to provide indications of the estimate of the packet loss rate parameter, the estimate of the video frame rate parameter, and the estimate of the coding bit rate parameter, to the video quality estimation component 106, which uses the respective video quality parameter estimates to generate an estimate of the perceptual quality of the video that is delivered to the end user.

Figure 2:
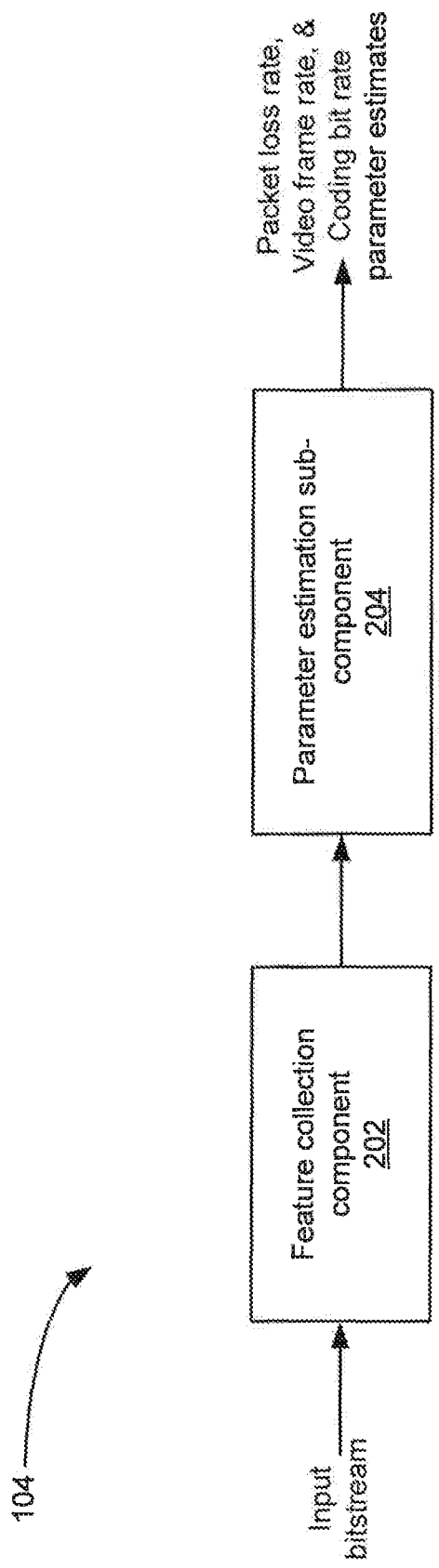
FIG. 2 is a block diagram of the exemplary parameter estimation component of FIG. 1, including an exemplary feature collection component, and an exemplary parameter estimation sub-component.

FIG. 2 depicts an illustrative embodiment of the parameter estimation component 104 of FIG. 1. As shown in FIG. 2, the parameter estimation component 104 includes a feature collection component 202, and a parameter estimation sub-component 204. The feature collection component 202 is operative to receive the input bitstream from the data collection component 102, and to extract the predetermined information from the input bitstream, such information including, but not limited to, the number of bits received, the number of packets received, and the number of packets lost, for each segment of N video frames.

Figure 3:
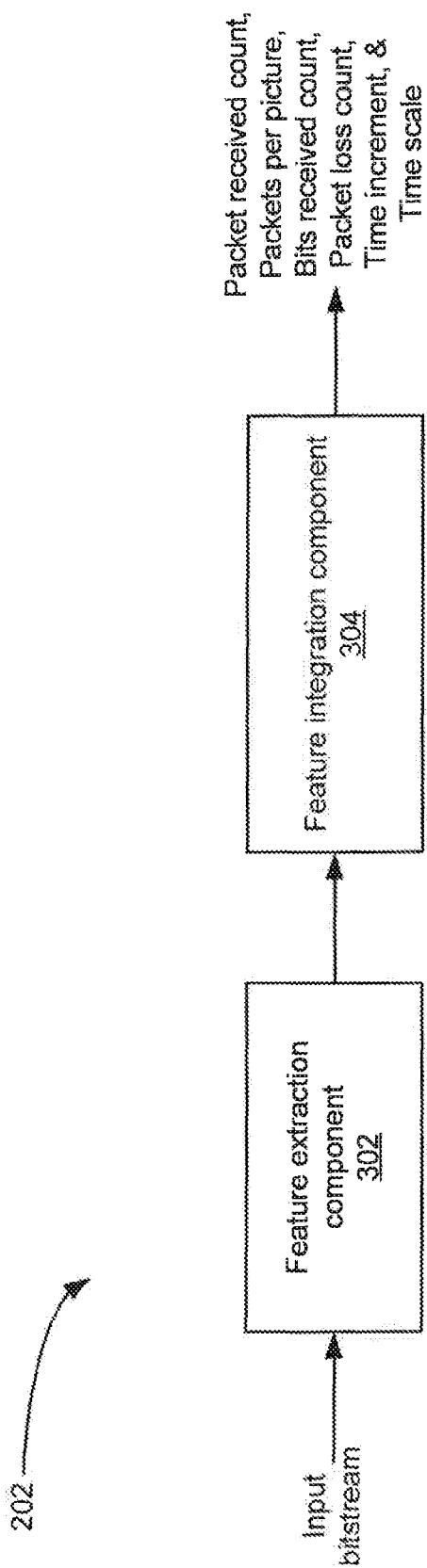
FIG. 3 is a block diagram of the exemplary feature collection component of FIG. 2, including an exemplary feature extraction component, and an exemplary feature integration component.

FIG. 3 depicts an illustrative embodiment of the feature collection component 202 of FIG. 2. As shown in FIG. 3, the feature collection component 202 includes a feature extraction component 302, and a feature integration component 304. The feature extraction component 302 is operative to receive the input bitstream, which is comprised of a plurality of packets. In accordance with the illustrative embodiment of FIG. 3, the feature extraction component 302 is operative, for each packet received in the input bitstream, to extract at least the following information:

1) a bit count (also referred to herein as a/the "bitCount")—The bit count represents the number of bits of data contained in a respective packet.

2) a sequence number (also referred to herein as a/the "sequenceNumber")—Each packet in the input bitstream contains a sequence number, which operates as a counter. In the case of no packet losses, the sequence number of each packet is 1 greater than the sequence number of the previous packet in the input bitstream. When the sequence number of a packet reaches a predetermined maximum limit, the next subsequent packet will have a sequence number that is equal to a predetermined minimum limit.

3) a time stamp (also referred to herein as a/the "timeStamp")—Associated with each video frame in the input bitstream is a timeStamp indicating the time, relative to a predetermined start time, at which the video frame is to be displayed. Each packet contains the time stamp of the video frame for which it carries data. Further, the time stamp increases with the display time. When the time stamp reaches a predetermined maximum limit, the next time stamp will be at or near a predetermined minimum limit.

4) a coded unit type (also referred to herein as a/the "codedUnitType")—Packets can contain video coding layer data or control data. The codedUnitType indicates the type of data contained in a respective packet.

5) a time scale (also referred to herein as a/the "timeScale")—The timeScale represents the clock frequency used to represent the time increments between video frames. For example, when transporting data that conforms to the H.264 coding format over the real-time transport protocol (RTP), the clock frequency used is typically 90 KHz, and therefore, for such a case, the timeScale value is equal to 90 KHz.

It is noted that the data for a single video frame can be spread over multiple packets in the input bitstream. Each of the multiple packets can therefore have the same timestamp, indicating the relative time that the video frame is to be displayed. Using such a timestamp, the feature integration component 304 can aggregate information at the video frame level across multiple packets. It is noted that the feature integration component 304 can aggregate much of that information over a segment of N video frames.

Figure 4:
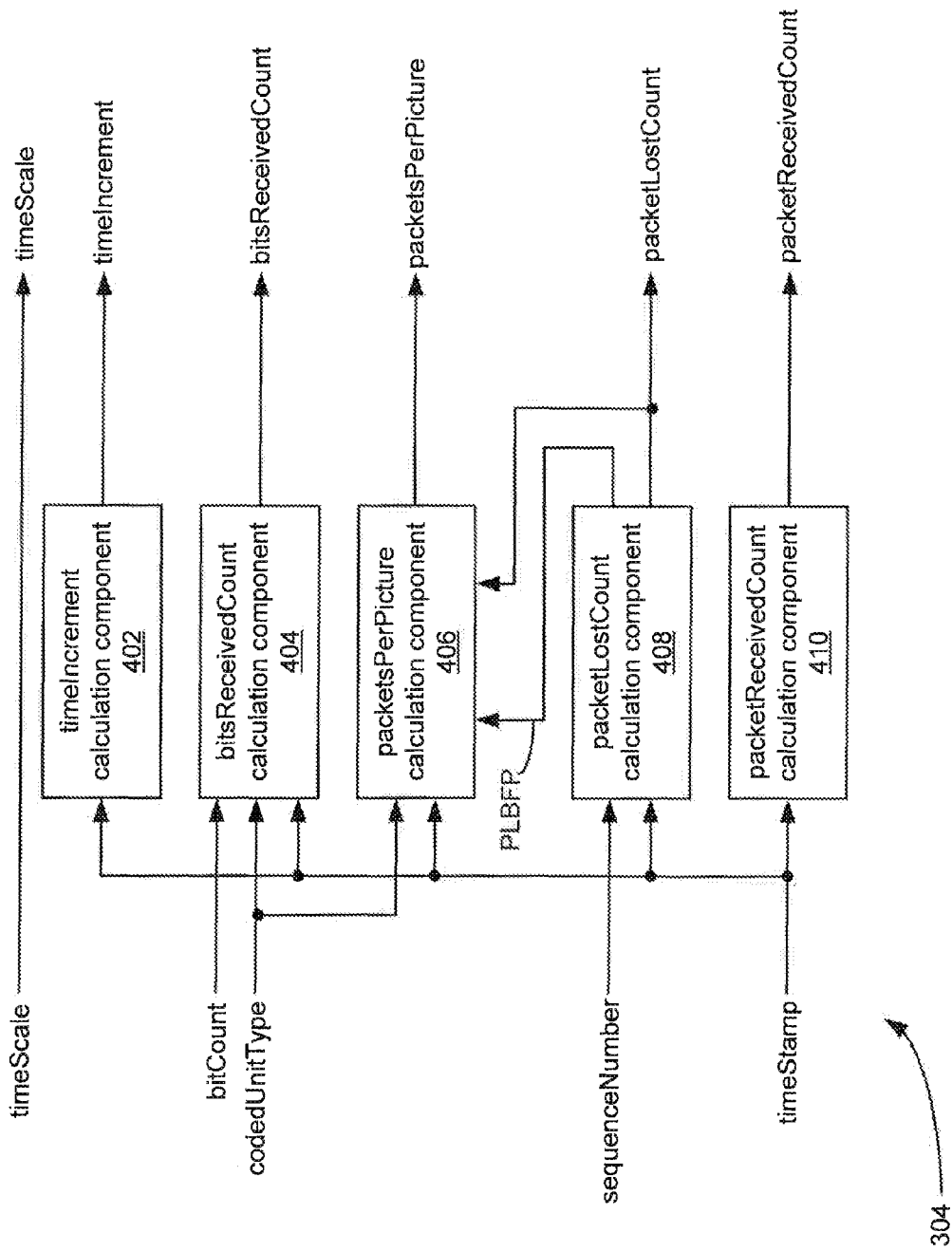
FIG. 4 is a block diagram of the exemplary feature integration component of FIG. 3, including an exemplary timeIncrement calculation component, an exemplary bitsReceivedCount calculation component, an exemplary packetsPerPicture calculation component, an exemplary packetLostCount calculation component, and an exemplary packetReceivedCount calculation component.

FIG. 4 depicts an illustrative embodiment of the feature integration component 304 of FIG. 3. As shown in FIG. 4, the feature integration component 304 includes a timeIncrement calculation component 402, a bitsReceivedCount calculation component 404, a packetsPerPicture calculation component 406, a packetLostCount calculation component 408, and a packetReceivedCount calculation component 410.

Using the bitCount, the sequenceNumber, the timeStamp, the codedUnitType, and the timeScale information extracted from the packets by the feature extraction component 302, the feature integration component 304 can generate at least the following information:

1) a packet received count (also referred to herein as a/the "packetReceivedCount")—The packetReceivedCount represents the number of packets received in a segment of N video frames. The packetReceivedCount calculation component 410 is operative to calculate the packetReceivedCount by counting the number of packets received for a given timestamp, and aggregating that information over the N video frames.

2) packets per picture (also referred to herein as a/the "packetsPerPicture")—The packetsPerPicture represents the number of packets received per video frame. The packetsPerPicture calculation component 406 is operative to calculate the packetsPerPicture by counting the packets that contain actual video-related data. For example, in the H.264 coding format, the sequence parameter set (SPS) packets and the picture parameter set (PPS) packets are referred to as non-video coding layer packets. As such, the packetsPerPicture calculation component 406 does not count the SPS packets and the PPS packets when calculating the packetsPerPicture.

3) a bits received count (also referred to herein as a/the "bitsReceivedCount")—The bitsReceivedCount represents the number of bits received in a segment of N video frames. The bitsReceivedCount calculation component 404 is operative to calculate the bitsReceivedCount by counting the number of bits received for a given timestamp, and aggregating that information over the N video frames.

4) a packet loss count (also referred to herein as a/the "packetLostCount")—The packetLostCount represents the total number of packets lost in a segment of N video frames, and the last received packet of the current video frame. The packetLostCount calculation component 408 is operative to calculate the packetLostCount by aggregating the per-frame packet loss count information over N video frames, using the sequence number information of the received packets.

5) a time increment (also referred to herein as a/the "timeIncrement")—The timeIncrement calculation component 402 is operative to calculate the timeIncrement, which represents the time interval between two adjacent video frames.

6) the time scale (also referred to herein as a/the "timeScale")—As discussed above, the timeScale represents the reference clock frequency. For example, when transporting data that conforms to the H.264 coding format over RTP, the reference clock frequency used is typically 90 KHz.

Figure 5:
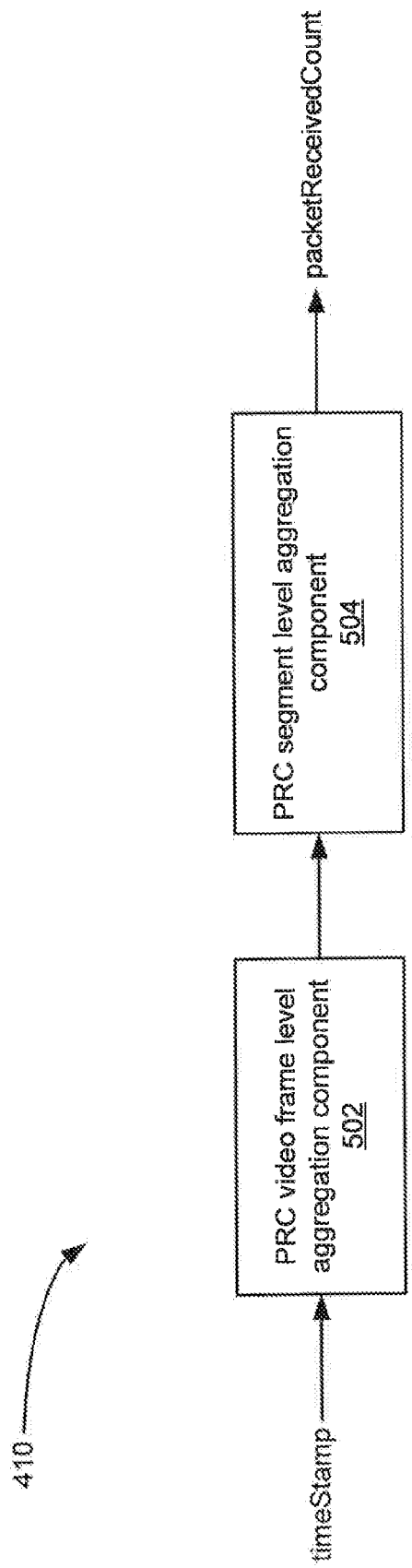
FIG. 5 is a block diagram of the exemplary packetReceivedCount (PRC) calculation component of FIG. 4, including an exemplary PRC video frame level aggregation component, and an exemplary PRC segment level aggregation component.

FIG. 5 depicts an illustrative embodiment of the packetReceivedCount calculation component 410 of FIG. 4. As shown in FIG. 5, the packetReceivedCount (PRC) calculation component 410 includes a PRC video frame level aggregation component 502, and a PRC segment level aggregation component 504. The PRC video frame level aggregation component 502 is operative to receive, from the feature extraction component 302, the timestamp of an input packet (also referred to herein as "$TS_{input}$"), and to aggregate the number of packets received at the video frame level. The PRC video frame level aggregation component 502 is further operative to maintain the current timestamp (also referred to herein as "$TS_{curr}$") that it is processing, and to maintain the packet count (PC) for that timestamp. The PRC segment level aggregation component 504 is operative to aggregate the number of packets over all of the video frames in the segment of N video frames, thereby generating the packetReceivedCount.

Figure 6:
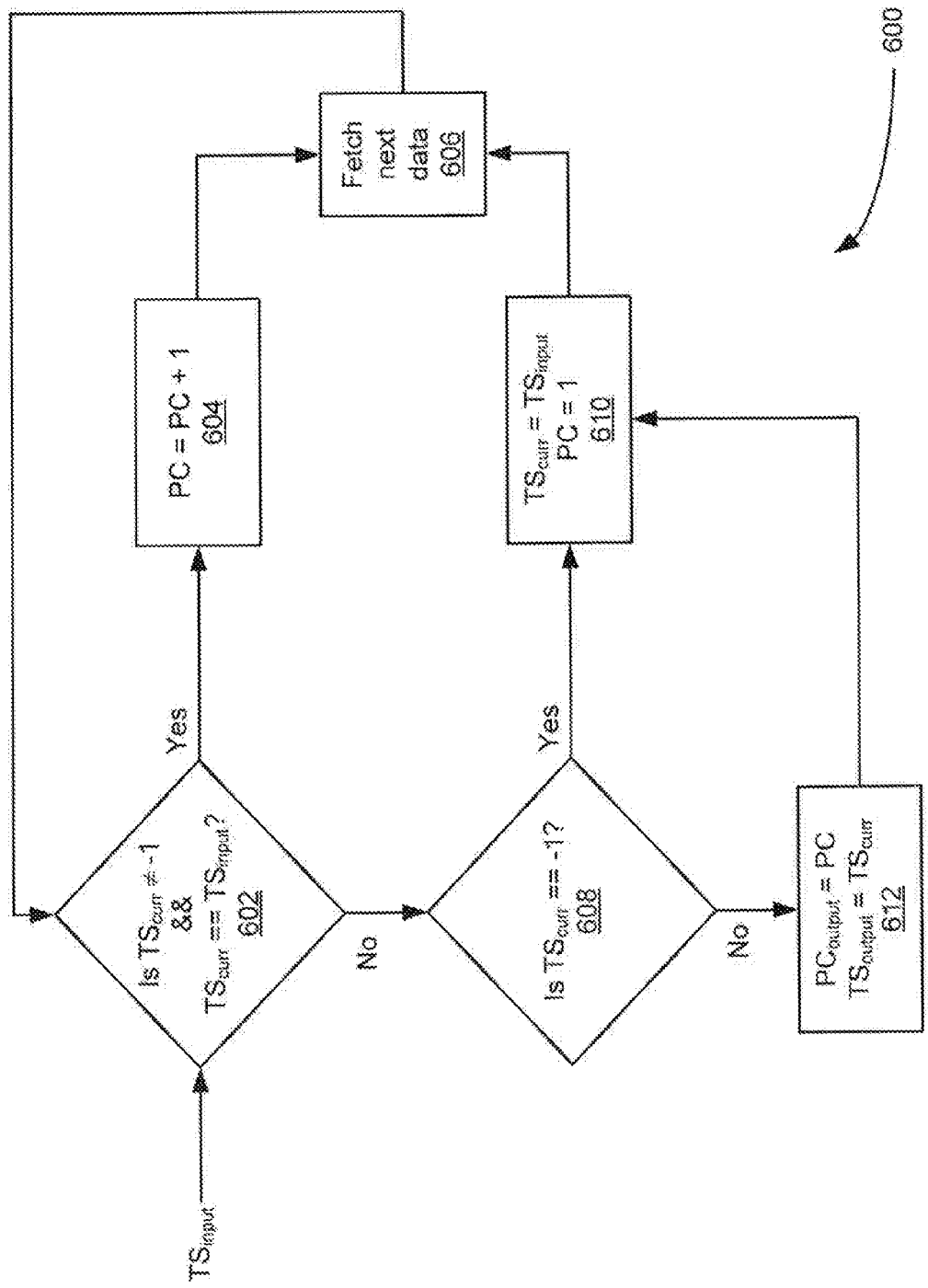
FIG. 6 is a flow diagram of an exemplary method of operating the exemplary PRC video frame level aggregation component of FIG. 5.

FIG. 6 depicts an illustrative method 600 of operating the PRC video frame level aggregation component 502 of FIG. 5. In accordance with the illustrative method 600 of FIG. 6, the PRC video frame level aggregation component 502 counts the number of packets received for each video frame, taking into account that all of the packets corresponding to the same video frame have the same timestamp. Specifically, the PRC video frame level aggregation component 502 implements a video frame level packet counter for performing the function of counting the number of packets received for each video frame. It is noted that the method 600 of FIG. 6 receives, as an input, the timestamp of the input packet ($TS_{input}$). Further, the method 600 operates on two variables, namely, the current timestamp ($TS_{curr}$) and the packet count (PC), which are initialized to −1 and 0, respectively. Moreover, the method 600 generates, as outputs, the output timestamp (also referred to herein as "$TS_{output}$"), and the output packet count summed over the video frame (also referred to herein as "$PC_{output}$"). It is further noted that, for the first $TS_{input}$ received as an input to the method 600, $TS_{curr}$ is made equal to $TS_{input}$, and PC is set to 1.

As depicted in step 602 (see FIG. 6), a determination is made as to whether the current timestamp ($TS_{curr}$) is not equal to −1, but is the same as the timestamp of the input packet ($TS_{input}$). If $TS_{curr}$ is not equal to −1, but is the same as $TS_{input}$, then the packet count (PC) is incremented, as depicted in step 604. If $TS_{curr}$ is equal to −1 and is different from $TS_{input}$, then the method 600 proceeds from step 602 to step 608, in which a determination is made as to whether the current timestamp ($TS_{curr}$) is equal to −1. If $TS_{curr}$ is equal to −1, then $TS_{curr}$ is made equal to $TS_{input}$, and PC is set to 1, as depicted in step 610. If $TS_{curr}$ is not equal to −1, then the output packet count ($PC_{output}$) is made equal to the packet count (PC), and the output timestamp ($TS_{output}$) is made equal to the current timestamp ($TS_{curr}$), as depicted in step 612. In this way, the method 600 provides the current value of PC as the output, $PC_{output}$, for the current timestamp, $TS_{curr}$. After step 612 is executed, the method 600 proceeds from step 612 to step 610, in which $TS_{curr}$ is made equal to $TS_{input}$, and PC is set to 1. If step 604 is executed following the execution of step 602, then the method 600 proceeds from step 604 to step 606. Similarly, if step 610 is executed directly following the execution of step 608, or following the execution of step 612, then the method 600 proceeds from step 610 to step 606, in which the timestamp of the next input packet ($TS_{input}$) is fetched. After step 606 is executed, the method 600 proceeds from step 606 to step 602. It is noted that, in accordance with the illustrative method 600 of FIG. 6, the output, $PC_{output}$, is ultimately made equal to the number of packets received for each video frame, as defined by the current timestamp, $TS_{curr}$.

Figure 7:
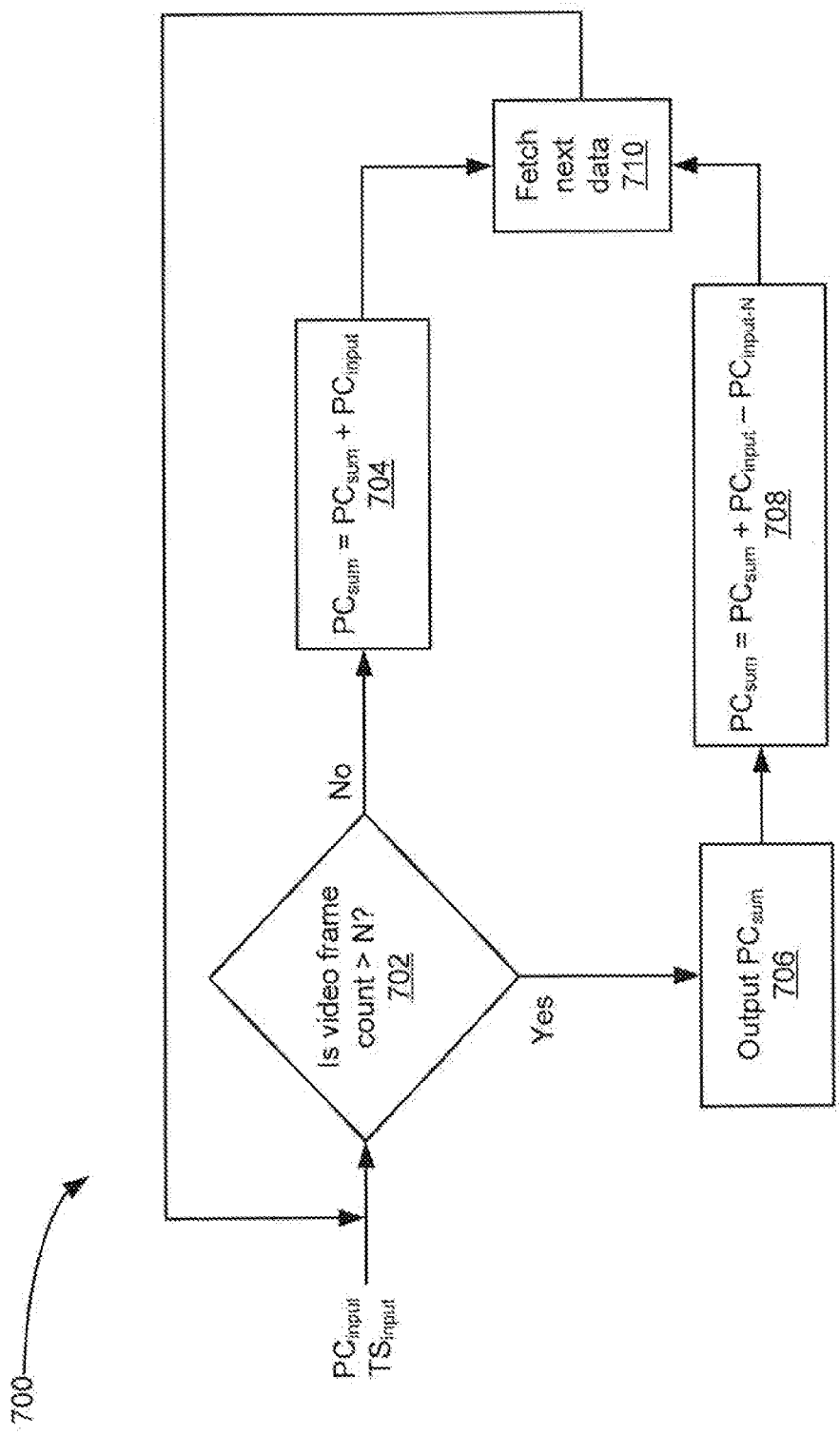
FIG. 7 is a flow diagram of an exemplary method of operating the exemplary PRC segment level aggregation component of FIG. 5.

FIG. 7 depicts an illustrative method 700 of operating the PRC segment level aggregation component 504 of FIG. 5. In accordance with the illustrative method 700 of FIG. 7, the PRC segment level aggregation component 504 aggregates the number of packets received in a segment of N video frames. Specifically, the PRC segment level aggregation component 504 implements a sliding window packet counter, taking, as inputs, an input packet count ($PC_{input}$; video frame level) and the timestamp of an input packet ($TS_{input}$), which correspond to the outputs, $PC_{output}$ and $TS_{output}$, respectively, provided at step 612 of the method 600 (see FIG. 6). In effect, the method 700 (see FIG. 7) sums the number of packets that fall within the sliding window, which operates in a first-in, first-out fashion. The method 700 operates on a variable, $PC_{sum}$, which represents the packet count summed over the segment of N video frames. Moreover, the method 700 generates the value of $PC_{sum}$ as an output. In the method 700 of FIG. 7, the variable, $PC_{sum}$, and a video frame count, are both initialized to 0.

As depicted in step 702 (see FIG. 7), a determination is made as to whether the video frame count is greater than N. If the video frame count is not greater than N, then the value of $PC_{input}$ is added to the value of the variable, $PC_{sum}$, as depicted in step 704. If the video frame count is greater than N, then the value of variable, $PC_{sum}$, is provided as the output for the timestamp, $TS_{input-1}$, as depicted in step 706. The method 700 then proceeds from step 706 to step 708, in which the value, $PC_{input}$-$PC_{input-N}$, is added to the value of the variable, PC. If step 704 is executed following the execution of step 702, then the method 700 proceeds from step 704 to step 710. Similarly, if step 708 is executed following the execution of step 706, then the method 700 proceeds from step 708 to step 710, in which the next packet count ($PC_{input}$) and its corresponding timestamp ($TS_{input}$) are fetched. After step 710 is executed, the method 700 proceeds from step 710 to step 702. It is noted that, in accordance with the illustrative method 700 of FIG. 7, the packet count, $PC_{sum}$, summed over the segment of N video frames, corresponds to the packetReceivedCount.

Figure 8:
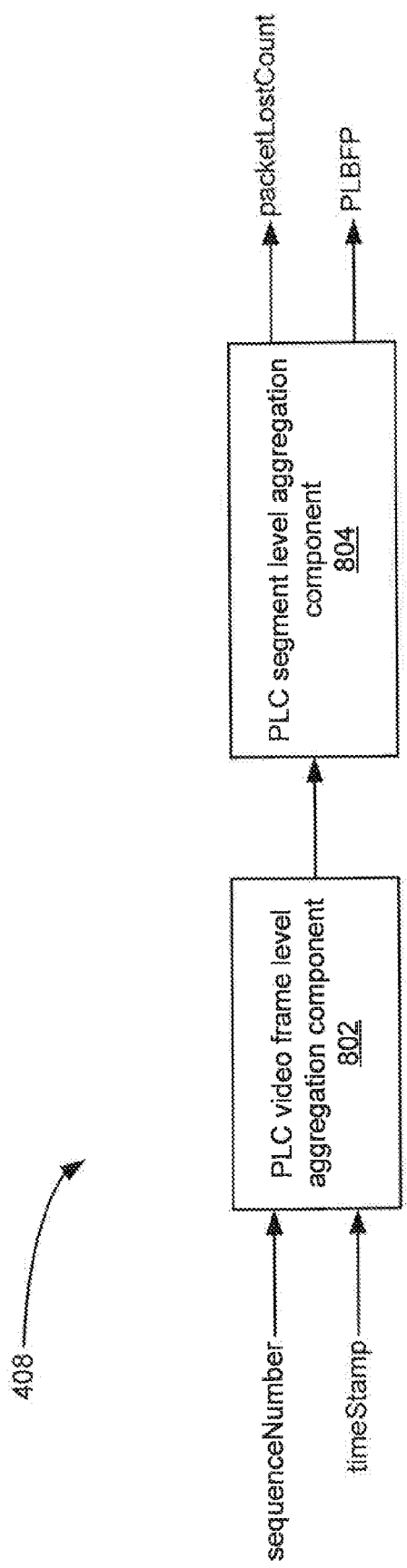
FIG. 8 is a block diagram of the exemplary packetLostCount (PLC) calculation component of FIG. 4, including an exemplary PLC video frame level aggregation component, and an exemplary PLC segment level aggregation component.

FIG. 8 depicts an illustrative embodiment of the packetLostCount calculation component 408 of FIG. 4. As shown in FIG. 8, the packetLostCount (PLC) calculation component 408 includes a PLC video frame level aggregation component 802, and a PLC segment level aggregation component 804. The PLC video frame level aggregation component 802 is operative to receive, from the feature extraction component 302 (see FIG. 3), the sequence number of the input packet (also referred to herein as "$SEQ_{input}$"), and the timestamp of the input packet ($TS_{input}$). The PLC video frame level aggregation component 802 is further operative to maintain the current timestamp ($TS_{curr}$) it is processing, the packet loss count (also referred to herein as a/the packetLostCount or "PLC") for the current timestamp ($TS_{curr}$), the packet loss-before-first-packet (also referred to herein as "PLBFP") for the current timestamp ($TS_{curr}$), the previous sequence number (also referred to herein as "$SEQ_{prev}$"), and the current packet loss count between the previously received packet and the current received packet (also referred to herein as "$PLC_{curr}$"). The PLC segment level aggregation component 804 is operative to generate the packetLostCount, and a value representing the packet loss-before-first-packet (PLBFP).

Figure 9:
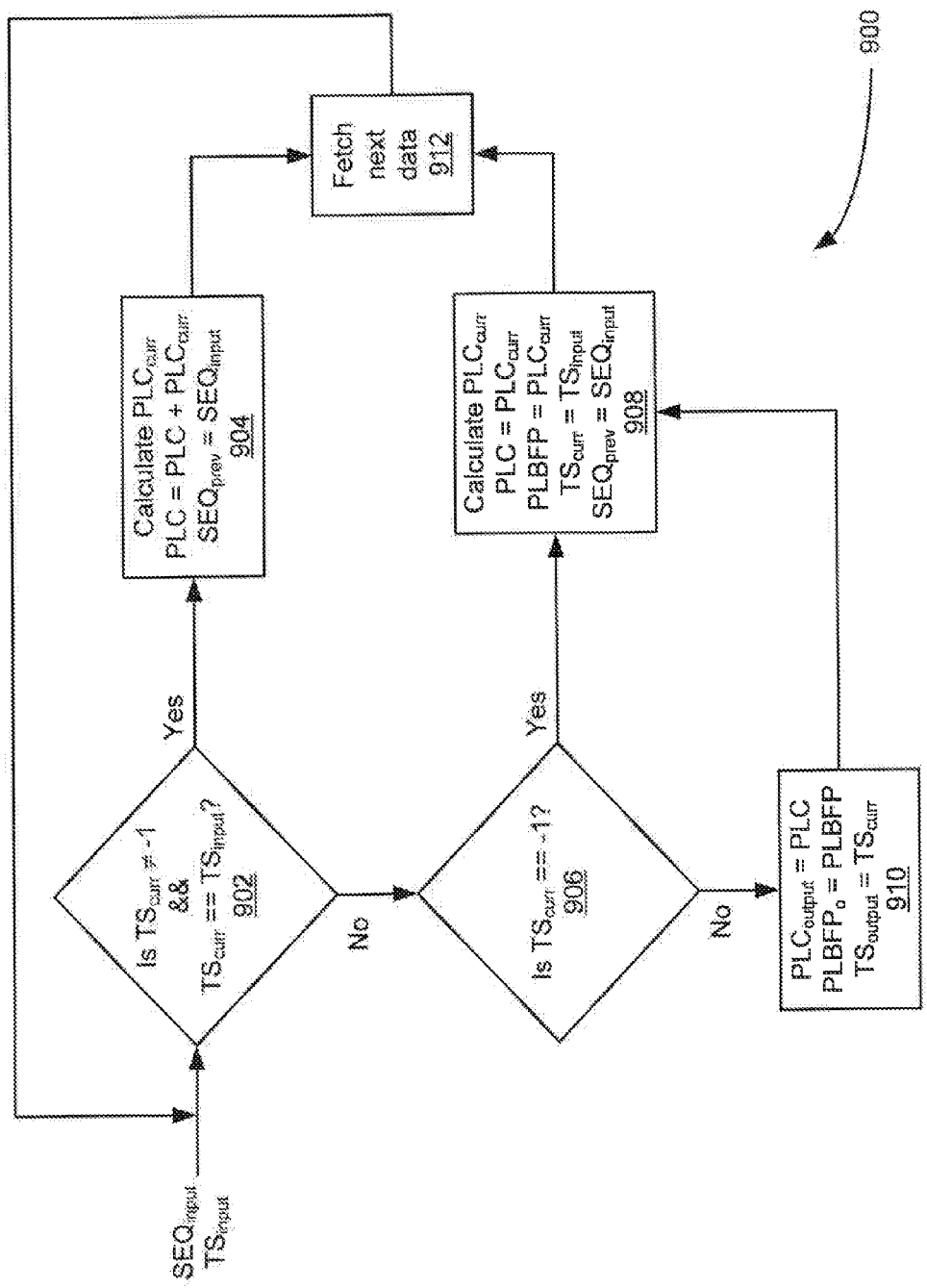
FIG. 9 is a flow diagram of an exemplary method of operating the exemplary PLC video frame level aggregation component of FIG. 8.

FIG. 9 depicts an illustrative method 900 of operating the PLC video frame level aggregation component 802 of FIG. 8. In accordance with the illustrative method 900 of FIG. 9, the PLC video frame level aggregation component 802 implements a video frame level packet loss counter that takes, as inputs, the timestamp of the input packet ($TS_{input}$), and the sequence number of the input packet ($SEQ_{input}$). Further, the method 900 operates on five variables, namely, the current timestamp ($TS_{curr}$), the packet loss count (PLC), the packet loss-before-first-packet (PLBFP), the current packet loss count (PLC$_{curr}$), and the previous sequence number (SEQ$_{prev}$). Moreover, the method 900 generates, as outputs, the output timestamp (TS$_{output}$), an output packet loss count summed over the current video frame (also referred to herein as "PLC$_{output}$"), and the output packet loss-before-first-packet for the current video frame (also referred to herein as "PLBFP$_o$"). It is noted that TS$_{curr}$ and SEQ$_{prev}$ are each initialized to −1, and that PLC, PLBFP, and PLC$_{curr}$ are each initialized to 0. It is further noted that, for the first TS$_{input}$ and the first SEQ$_{input}$ received as inputs to the video frame level packet loss counter, TS$_{curr}$ is made equal to TS$_{input}$, SEQ$_{prev}$ is made equal to the SEQ$_{input}$, PLC is set to 0, and PLBFP is set to 0.

As depicted in step 902 (see FIG. 9), a determination is made as to whether the current timestamp (TS$_{curr}$) is not equal to −1, but is the same as the timestamp of the input packet (TS$_{input}$). If TS$_{curr}$ is not equal to −1, but is the same as TS$_{input}$, then the current packet loss count (PLC$_{curr}$) is calculated, in accordance with equation (1) below.

$$PLC_{curr} = \begin{bmatrix} SEQ_{input} - SEQ_{prev} - 1, & \text{if } SEQ_{prev} \le SEQ_{input} \\ SEQ_{input} - SEQ_{prev} + SEQ_{max}, & \text{if } SEQ_{prev} > SEQ_{input} \end{bmatrix} \quad (1)$$

Further, the packet loss count (PLC) is incremented by the calculated value of PLC$_{curr}$, and the previous sequence number (SEQ$_{prev}$) is made equal to the sequence number of the input packet (SEQ$_{input}$), as depicted in step 904. If TS$_{curr}$ is equal to −1 and is different from TS$_{input}$, then the method 900 proceeds from step 902 to step 906, in which a determination is made as to whether TS$_{curr}$ is equal to −1. If TS$_{curr}$ is equal to −1, then the current packet loss count (PLC$_{curr}$) is calculated, in accordance with equation (1) above, PLC is made equal to PLC$_{curr}$, PLBFP is made equal to PLC$_{curr}$, TS$_{curr}$ made equal to TS$_{input}$, and SEQ$_{prev}$ is made equal to SEQ$_{input}$, as depicted in step 908. If TS$_{curr}$ is not equal to −1, then PLC$_{output}$ is made equal to PLC, PLBFP$_o$ is made equal to PLBFP, and TS$_{output}$ is made equal to TS$_{curr}$, as depicted in step 910. As further depicted in step 910, the method 900 generates the values of PLC$_{output}$, PLBFP$_o$, and TS$_{output}$, as outputs for TS$_{curr}$. For each video frame, the outputs generated in step 910 include the timestamp (TS$_{output}$) associated with that video frame, the number of packets lost (PLC$_{output}$) in the video frame, and the packet lost-before-first-packet (PLBFP$_o$) of the video frame. After step 910 is executed, the method 900 proceeds from step 910 to step 908. If step 904 is executed following the execution of step 902, then the method 900 proceeds from step 904 to step 912. Similarly, if step 908 is executed directly following the execution of step 906, or following the execution of step 910, then the method 900 proceeds from step 908 to step 912, in which the next TS$_{input}$ and the next SEQ$_{input}$ are fetched. After step 912 is executed, the method 900 proceeds from step 912 to step 902.

Figure 10:
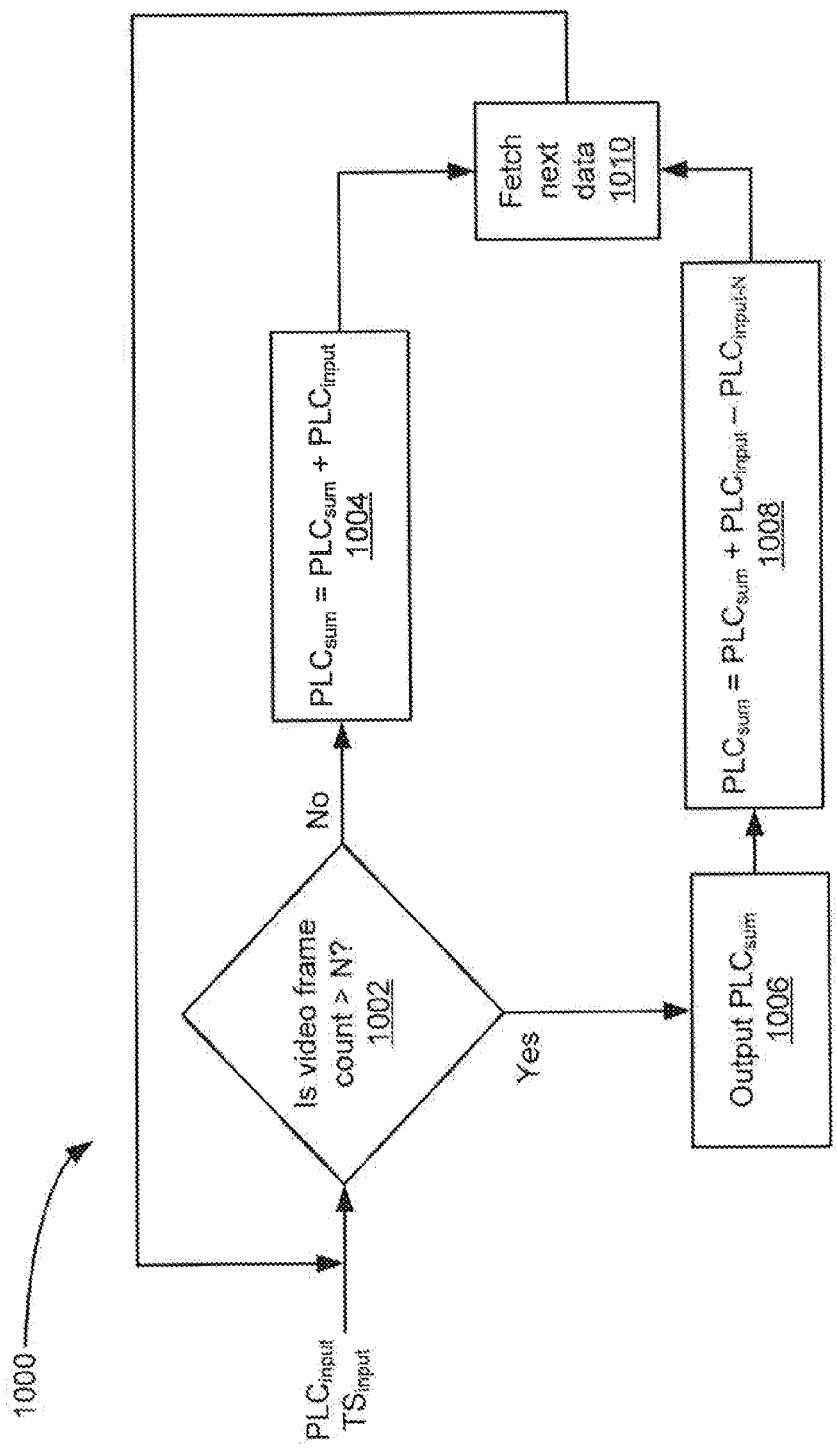
FIG. 10 is a flow diagram of an exemplary method of operating the exemplary PLC segment level aggregation component of FIG. 8.

FIG. 10 depicts an illustrative method 1000 of operating the PLC segment level aggregation component 804 of FIG. 8. In accordance with the illustrative method 1000 of FIG. 10, the PLC segment level aggregation component 804 aggregates the number of packets lost (PLC$_{output}$) in a segment of N video frames. Specifically, the PLC segment level aggregation component 804 implements a sliding window packet loss counter, taking, as inputs, PLC$_{input}$ and TS$_{input}$, which correspond to the outputs, PLC$_{output}$ and TS$_{output}$, respectively, provided at step 910 of the method 900 (see FIG. 9). The PLC segment level aggregation component 804 is operative to sum the number of packets lost that fall within the sliding window, which operates in a first-in, first-out fashion. The method 1000 operates on the variable, PLC$_{sum}$, which is the packet loss count summed over the segment of N video frames. Further, the method 1000 generates PLC$_{sum}$ as an output. It is noted that PLC$_{sum}$ is initialized to 0.

As depicted in step 1002 (see FIG. 10), a determination is made as to whether the video frame count is greater than N. If the video frame count is not greater than N, then the value of PLC$_{input}$ is added to the value of the variable, PLC$_{sum}$, as depicted in step 1004. If the video frame count is greater than N, then the value of the variable, PLC$_{sum}$, is provided as the output for the timestamp, TS$_{input-1}$, as depicted in step 1006. The method 1000 then proceeds from step 1006 to step 1008, in which the value, PLC$_{input}$-PLC$_{input-N}$, is added to the value of the variable, PLC$_{sum}$. If step 1004 is executed following the execution of step 1002, then the method 1000 proceeds from step 1004 to step 1010. Similarly, if step 1008 is executed following the execution of step 1006, then the method 1000 proceeds from step 1008 to step 1010, in which the next number of packets lost (PLC$_{input}$) and its corresponding timestamp (TS$_{input}$) are fetched. After step 1010 is executed, the method 1000 proceeds from step 1010 to step 1002. It is noted that, in accordance with the illustrative method 1000 of FIG. 10, the value of the variable, PLC$_{sum}$, provided as an output in step 1006 corresponds to the packetLostCount.

Figure 11:
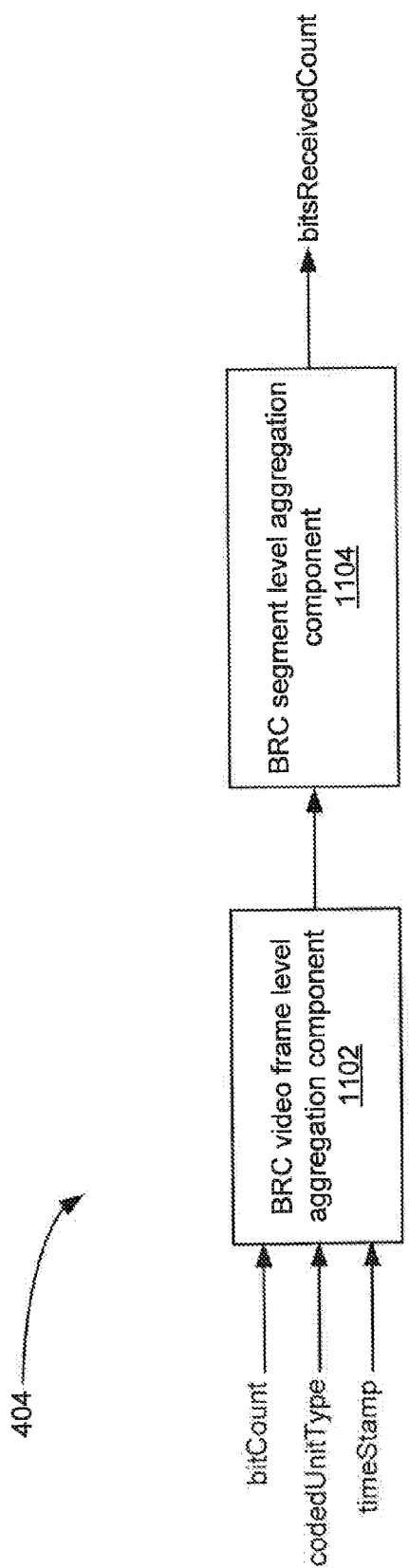
FIG. 11 is a block diagram of the exemplary bitsReceivedCount (BRC) calculation component of FIG. 4, including an exemplary BRC video frame level aggregation component, and an exemplary BRC segment level aggregation component.

FIG. 11 depicts an illustrative embodiment of the bitsReceivedCount calculation component 404 of FIG. 4. As shown in FIG. 4, the bitsReceivedCount (BRC) calculation component 404 includes a BRC video frame level aggregation component 1102, and a BRC segment level aggregation component 1104. The BRC video frame level aggregation component 1102 implements a video frame level bit counter, aggregating the number of bits received at the video frame level. Further, the BRC segment level aggregation component 1104 implements a sliding window bits received counter, aggregating the video frame level information, generated by the BRC video frame level aggregation component 1102, over all of the video frames in the segment of N video frames, thereby obtaining the bitsReceivedCount.

It is noted that a difference between the video frame level packet counter implemented by the PRC video frame level aggregation component 502 (see FIG. 5), and the video frame level bit counter implemented by the BRC video frame level aggregation component 1102 (see FIG. 11), is that not all of the bits that are input to the video frame level bit counter implemented by the component 1102 are included in the bit count. In accordance with the illustrative embodiment of FIG. 11, the bits that are input to the video frame level bit counter are filtered based on the coded unit type of the input packet (also referred to herein as "CUT$_{input}$"). For example, if CUT$_{input}$ corresponds to video data, then the bits that are input to the video frame level bit counter are included in the count; otherwise, they are discarded. The output of the video frame level bit counter implemented by the BRC video frame level aggregation component 1102 is the number of video data related bits for each video frame defined by the timestamp.

Figure 12:
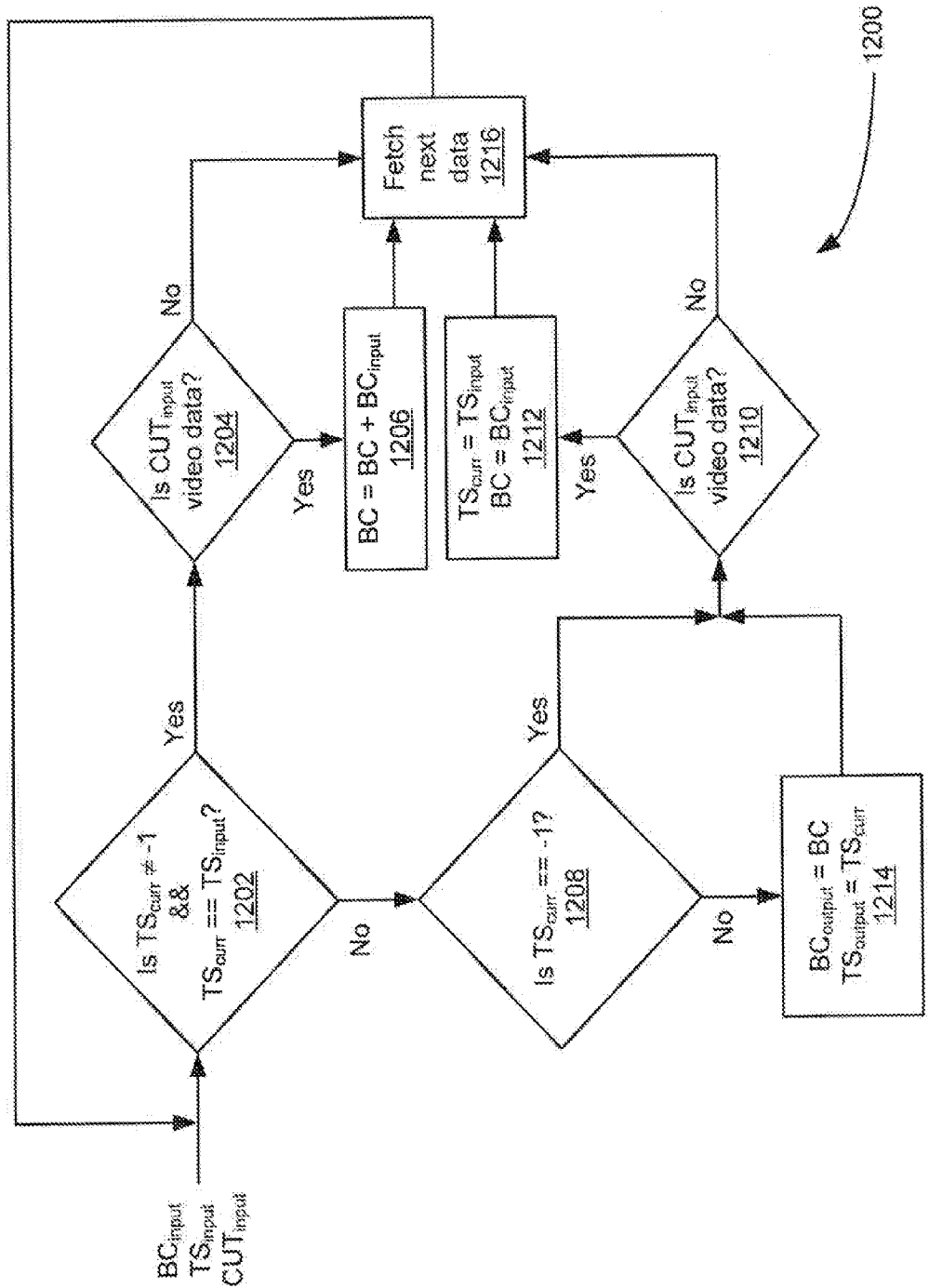
FIG. 12 is a flow diagram of an exemplary method of operating the exemplary BRC video frame level aggregation component of FIG. 11.

FIG. 12 depicts an illustrative method 1200 of operating the BRC video frame level aggregation component 1102 of FIG. 11. As discussed above, the BRC video frame level aggregation component 1102 implements a video frame level bit counter, which takes, as inputs, the timestamp of the input packet (TS$_{input}$), an input bit count (also referred to herein as "BC$_{input}$"), and the coded unit type of the input packet (CUT$_{input}$). The method 1200 operates on two variables, namely, the current timestamp (TS$_{curr}$), and a bit count (also referred to herein as "BC"). Moreover, the method 1200 generates the value of the output timestamp (TS$_{output}$), and the value of an output bit count (also referred to herein as "$BC_{output}$"), as outputs. It is noted that the current timestamp ($TS_{curr}$) is initialized to −1, and the bit count (BC) is initialized to 0.

As depicted in step 1202 (see FIG. 12), a determination is made as to whether the current timestamp ($TS_{curr}$) is not equal to −1, but is the same as the timestamp of the input packet ($TS_{input}$). If $TS_{curr}$ is not equal to −1, but is the same as $TS_{input}$, then a determination is made as to whether the coded unit type of the input packet ($CUT_{input}$) is video data, as depicted in step 1204. If $CUT_{input}$ is video data, then the input bit count ($BC_{input}$) is added to the bit count (BC), as depicted in step 1206. If $TS_{curr}$ is equal to −1 and is different from $TS_{input}$, then the method 1200 proceeds from step 1202 to step 1208, in which a determination is made as to whether $TS_{curr}$ is equal to −1. If $TS_{curr}$ is equal to −1, then a determination is made as to whether $CUT_{input}$ is video data, as depicted in step 1210. If $CUT_{input}$ is video data, then $TS_{curr}$ is made equal to $TS_{input}$, and BC is made equal to $BC_{input}$, as depicted in step 1212. If $TS_{curr}$ is not equal to −1, then the output bit count ($BC_{output}$) is made equal to BC, and the output timestamp ($TS_{output}$) is made equal to $TS_{curr}$, as depicted in step 1214. As further depicted in step 1214, the method 1200 generates the values of $BC_{output}$ and $TS_{output}$ as outputs for $TS_{curr}$. After step 1214 is executed, the method 1200 proceeds from step 1214 to step 1210. Moreover, if step 1204 is executed following the execution of step 1202, and it is determined in step 1204 that $CUT_{input}$ is not video data, then the method 1200 proceeds from step 1204 to step 1216. Similarly, if step 1210 is executed following the execution of step 1208 or 1214, and it is determined in step 1210 that $CUT_{input}$ is not video data, then the method 1200 proceeds from step 1210 to step 1216. In addition, if step 1206 is executed following the execution of step 1204, then the method 1200 proceeds from step 1206 to step 1216. Similarly, if step 1212 is executed following the execution of step 1210, then the method 1200 proceeds from step 1212 to step 1216, in which the next $BC_{input}$, the next $TS_{input}$, and the next $CUT_{input}$ are fetched. After step 1216 is executed, the method 1200 proceeds from step 1216 to step 1202.

Figure 13:
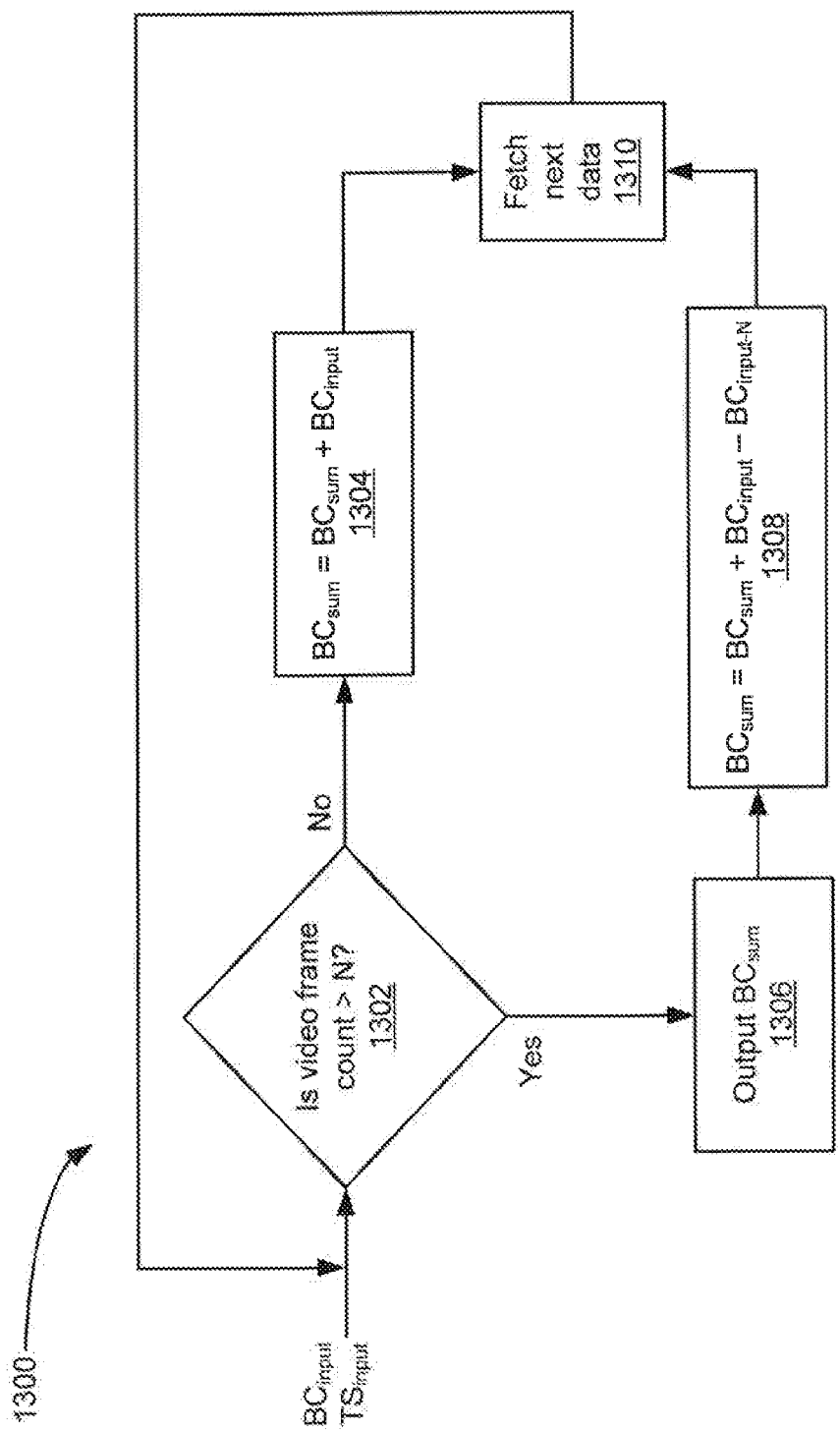
FIG. 13 is a flow diagram of an exemplary method of operating the exemplary BRC segment level aggregation component of FIG. 11.

FIG. 13 depicts an illustrative method 1300 of operating the BRC segment level aggregation component 1104 of FIG. 11. As discussed above, the BRC segment level aggregation component 1104 implements a sliding window bits received counter, which takes, as inputs, $BC_{input}$ and $TS_{input}$, which correspond to the outputs $BC_{output}$ and $TS_{output}$, respectively, provided at step 1214 of the method 1200 (see FIG. 12). The BRC segment level aggregation component 1104 is operative to sum the number of packets lost that fall within the sliding window, which operates in a first-in, first-out fashion. The method 1300 operates on a variable, $BC_{sum}$, which is the bit count summed over the segment of N video frames. Further, the method 1300 generates, as an output, $BC_{sum}$, which corresponds to the number of bits received in the respective segment of N video frames (bitsReceivedCount). It is noted that $BC_{sum}$ is initialized to 0.

As depicted in step 1302 (see FIG. 13), a determination is made as to whether the video frame count is greater than N. If the video frame count is not greater than N, then the value of $BC_{input}$ is added to the value of the variable, $BC_{sum}$, as depicted in step 1304. If the video frame count is greater than N, then the value of the variable, $BC_{sum}$, is provided as the output for the timestamp, $TS_{input-1}$, as depicted in step 1306. The method 1300 then proceeds from step 1306 to step 1308, in which the value, $BC_{input}$-$BC_{input-N}$, is added to the value of the variable, $BC_{sum}$. If step 1304 is executed following the execution of step 1302, then the method 1300 proceeds from step 1304 to step 1310. Similarly, if step 1308 is executed following the execution of step 1306, then the method 1300 proceeds from step 1308 to step 1310, in which the next bit count ($BC_{input}$) and its corresponding timestamp ($TS_{input}$) are fetched. After step 1310 is executed, the method 1300 proceeds from step 1310 to step 1302.

Figure 14:
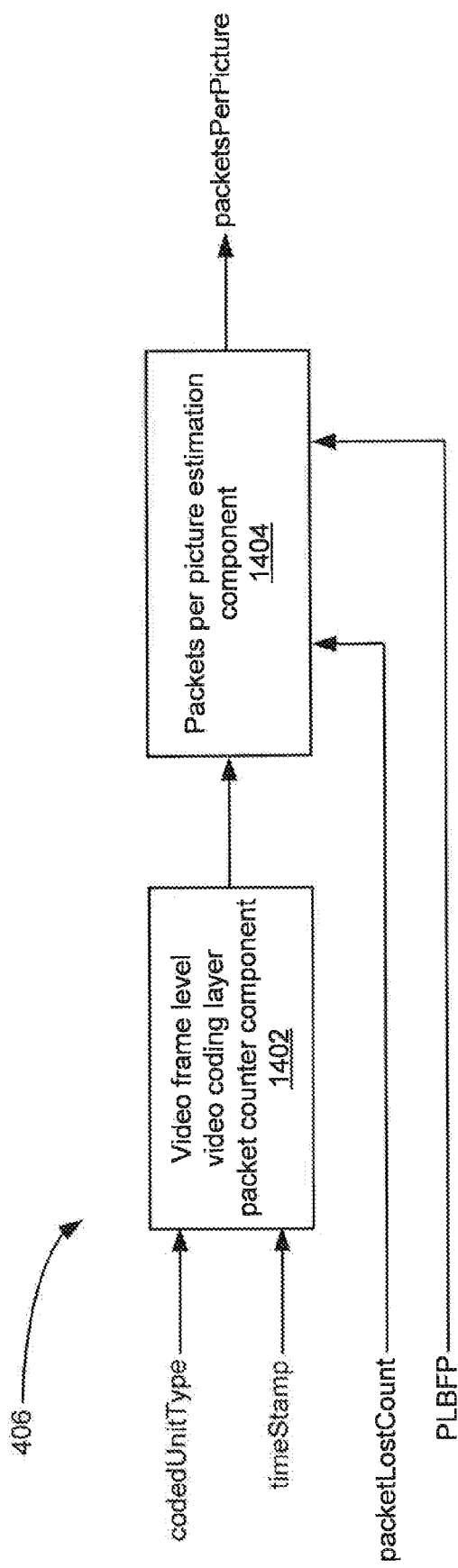
FIG. 14 is a block diagram of the exemplary packetsPerPicture calculation component of FIG. 4, including an exemplary video frame level video coding layer packet counter component, and an exemplary packets per picture estimation component.

FIG. 14 depicts an illustrative embodiment of the packetsPerPicture calculation component 406 of FIG. 4. As shown in FIG. 14, the packetsPerPicture calculation component 406 includes a video frame level video coding layer packet counter component 1402, and a packets per picture estimation component 1404. The packetsPerPicture represents the number of packets received per video frame, and is used to estimate the coding bit rate parameter. It is noted that the calculation of the packetsPerPicture is different from the calculation of the packetReceivedCount in that the calculated packetsPerPicture value does not include the non-video coding layer packets. In addition, the calculated packetsPerPicture value is updated once the level of accuracy of the most recent calculated packetsPerPicture value is verified. Accordingly, if packets are lost, and it is determined that the most recent calculated packetsPerPicture value is inaccurate, then the calculated packetsPerPicture value is not updated.

In accordance with the illustrative embodiment of FIG. 14, the packetsPerPicture calculation component 406 employs a plurality of parameters to calculate the packetsPerPicture value, including a video coding layer packet count (also referred to herein as "VCLPC"), the codedUnitType, the timeStamp, the packetLostCount, and the packet loss-before-first-packet (PLBFP). As discussed above, the packetLostCount and the PLBFP are both calculated by the packetLostCount calculation component 408 (see FIG. 4).

Figure 15:
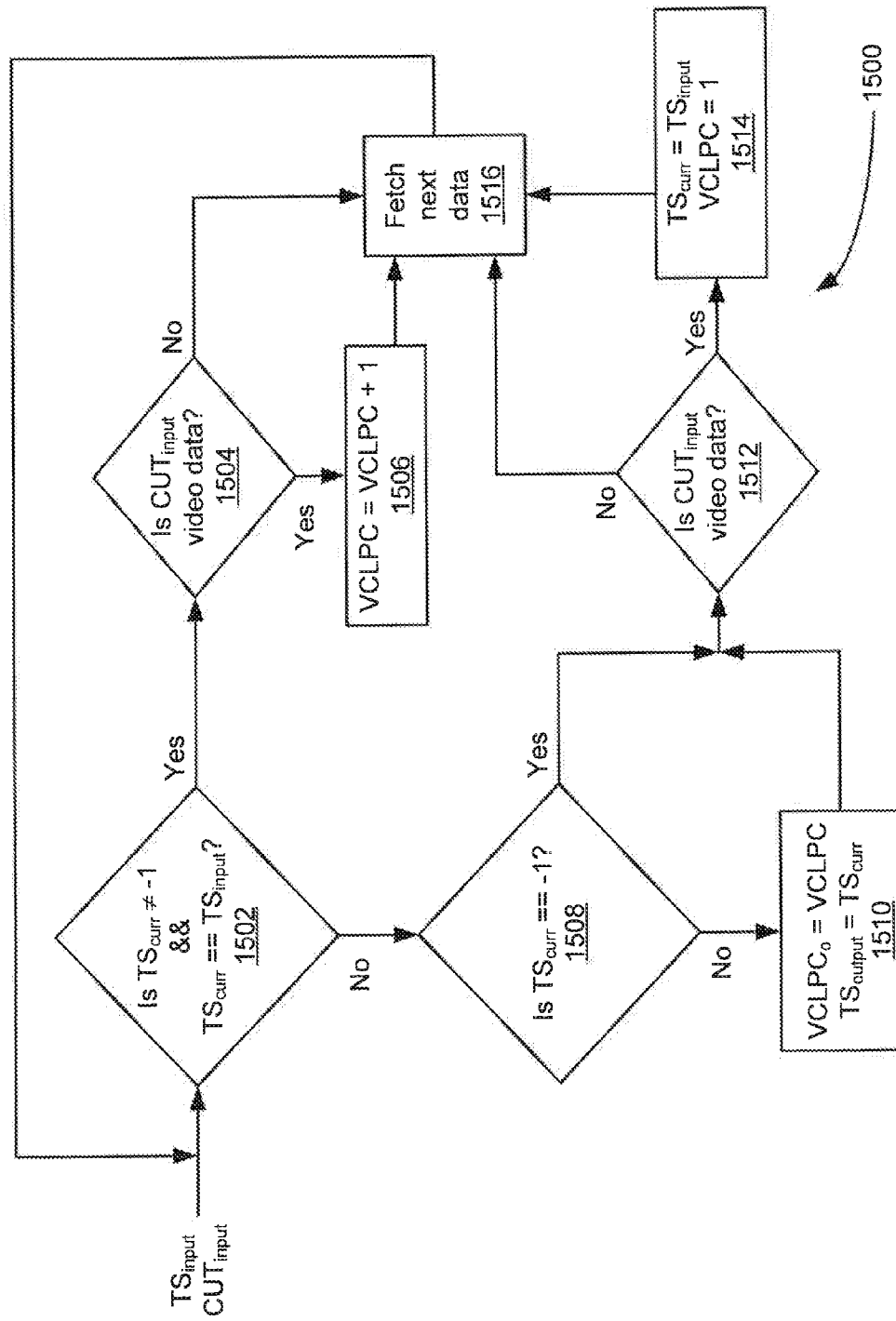
FIG. 15 is a flow diagram of an exemplary method of operating the exemplary video frame level video coding layer packet counter component of FIG. 14.

FIG. 15 depicts an illustrative method 1500 of operating the video frame level video coding layer packet counter component 1402 of FIG. 14, for calculating VCLPC. It is noted that, in accordance with the illustrative method of FIG. 15, packets are counted if they contain video coding layer data. In further accordance with the illustrative method of FIG. 15, the packets are filtered based on the coded unit type of the input packet ($CUT_{input}$). The method 1500 of FIG. 15 receives, as inputs, the timestamp of the input packet ($TS_{input}$), and the coded unit type of the input packet ($CUT_{input}$). Further, the method 1500 operates on two variables, namely, the current timestamp ($TS_{curr}$), and the video coding layer packet count (VCLPC), which corresponds to the packet count for video-related data. Moreover, the method 1500 generates, as outputs, the value of the output timestamp ($TS_{output}$), and the value of the output video coding layer packet count (also referred to herein as "$VCLPC_o$"). It is noted that the current timestamp ($TS_{curr}$) is initialized to −1, and the video coding layer packet count (VCLPC) is initialized to 0.

As depicted in step 1502 (see FIG. 15), a determination is made as to whether the current timestamp ($TS_{curr}$) is not equal to −1, but is the same as the timestamp of the input packet ($TS_{input}$). If $TS_{curr}$ is not equal to −1, but is the same as $TS_{input}$, then a determination is made as to whether the coded unit type of the input packet ($CUT_{input}$) is video data, as depicted in step 1504. If $CUT_{input}$ is video data, then VCLPC is incremented, as depicted in step 1506. If $TS_{curr}$ is equal to −1 and is different from $TS_{input}$, then the method 1500 proceeds from step 1502 to step 1508, in which a determination is made as to whether $TS_{curr}$ is equal to −1. If $TS_{curr}$ is equal to −1, then a determination is made as to whether $CUT_{input}$ is video data, as depicted in step 1512. If $CUT_{input}$ is video data, then $TS_{curr}$ is made equal to $TS_{input}$, and VCLPC is made equal to 1, as depicted in step 1514. If $TS_{curr}$ is not equal to −1, then the output video coding layer packet count ($VCLPC_o$) is made equal to VCLPC, and the output timestamp ($TS_{output}$) is made equal to $TS_{curr}$, as depicted in step 1510. As further depicted in step 1510, the method 1500 generates the values of $VCLPC_o$ and $TS_{output}$ as outputs for $TS_{curr}$. The method 1500 then proceeds from step 1510 to step 1512. Moreover, if step 1504 is executed following the execution of step 1502, and it is determined in step 1504 that $CUT_{input}$ is not video data, then the method 1500 proceeds from step 1504 to step 1516. Similarly, if step 1512 is executed following the execution of step 1508 or 1510, and it is determined in step 1512 that $CUT_{input}$ is not video data, then the method 1500 proceeds from step 1512 to step 1516. In addition, if step 1506 is executed following the execution of step 1504, then the method 1500 proceeds from step 1506 to step 1516. Similarly, if step 1514 is executed following the execution of step 1512, then the method 1500 proceeds from step 1514 to step 1516, in which the next $TS_{input}$ and the next $CUT_{input}$ are fetched. The method 1500 then proceeds from step 1516 to step 1502.

Figure 16:
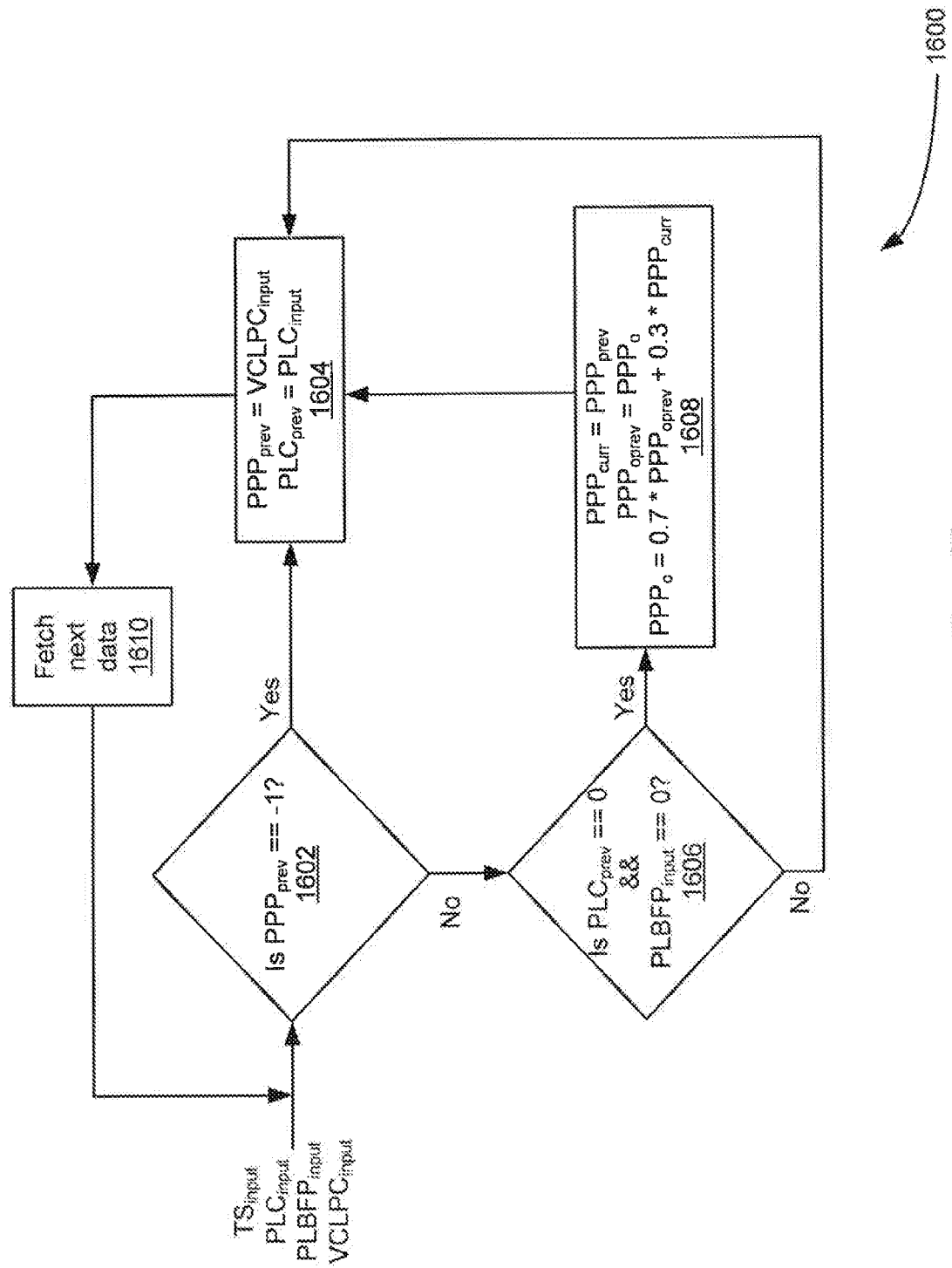
FIG. 16 is a flow diagram of an exemplary method of operating the exemplary packets per picture estimation component of FIG. 14.

FIG. 16 depicts an illustrative method 1600 of operating the packets per picture estimation component 1404 of FIG. 14. In accordance with the illustrative method 1600 of FIG. 16, the packets per picture estimation component 1404 determines whether there were any packet losses in a previous video frame using a previous packet loss count value (also referred to herein as "$PLC_{prev}$"), and whether there were any packet losses-before-first-packet (PLBFP) for the current video frame. If there were no packet losses, then the previous packetsPerPicture estimate, which is set to be the VCLPC of the previous video frame, is made equal to the current estimate of the packetsPerPicture (also referred to herein as a/the "currPacketsPerPicture" or "$PPP_{curr}$"). If there were some packet losses, then no updates are made, and the next video frame is operated on. For each new currPacketsPerPicture estimate, the actual packetsPerPicture estimate output (also referred to herein as "packetsPerPictureOutput" or "$PPP_o$") is obtained using a weighted sum of the previous packetsPerPicture estimate output (also referred to herein as a/the "prevPacketsPerPictureOutput" or "$PPP_{oprev}$"), and the current packetsPerPicture estimate ($PPP_{curr}$), as shown in equation (2) below.

$$packetsPerPictureOutput = 0.7 * prevPacketsPerPictureOutput + 0.3 * currPacketsPerPicture \quad (2)$$

It is noted that the method 1600 of FIG. 16 receives, as inputs, the time stamp of the input packet ($TS_{input}$), the input packet loss count (also referred to herein as "$PLC_{input}$"), the input packet loss-before-first-packet (also referred to herein as "$PLBFP_{input}$"), and the input video coding layer packet count ($VCLPC_{input}$). Further, the method 1600 operates on two variables, namely, the previous packetsPerPicture estimate ($PPP_{prev}$), and the previous packet loss count value ($PLC_{prev}$). Moreover, the method 1600 generates, as an output, the value of the packetsPerPictureOutput ($PPP_o$). It is further noted that the previous packetsPerPicture estimate ($PPP_{prev}$) is initialized to −1, and the previous packet loss count value ($PLC_{prev}$) is initialized to 0.

As depicted in step 1602 (see FIG. 16), a determination is made as to whether the previous packetsPerPicture estimate ($PPP_{prev}$) is equal to −1. If $PPP_{prev}$ is equal to −1, then $PPP_{prev}$ is made equal to the input video coding layer packet count ($VCLPC_{input}$), and the previous packet loss count value ($PLC_{prev}$) is made equal to the input packet loss count ($PLC_{input}$), as depicted in step 1604. If $PPP_{prev}$ is not equal to −1, then a determination is made as to whether $PLC_{prev}$ is equal to 0, and the input packet loss-before-first-packet ($PLBFP_{input}$) is equal to 0, as depicted in step 1606. If $PLC_{prev}$ is equal to 0, and $PLBFP_{input}$ is equal to 0, then the method 1600 proceeds d from step 1606 to step 1608, in which the current packetsPerPicture ($PPP_{curr}$) is made equal to previous packetsPerPicture ($PPP_{prev}$), the prevPaketsPerPictureOutput ($PPP_{oprev}$) is made equal to packetsPerPictureOutput ($PPP_o$), the output packetsPerPicture ($PPP_o$) is calculated using $PPP_{curr}$ and $PPP_{oprev}$, in accordance with equation (2) above, and the value of $PPP_o$ is generated as the output packetsPerPicture. After step 1608 is executed, the method 1600 proceeds from step 1608 to step 1604. Moreover, if $PLC_{prev}$ is not equal to 0 and $PLBFP_{input}$ is not equal to 0, then the method 1600 proceeds from step 1606 to step 1604. After step 1604 is executed, the method 1600 proceeds from step 1604 to step 1610, in which the next $TS_{input}$, the next $PLC_{input}$, the next $PLBFP_{input}$, and the next $VCLPC_{input}$ are fetched. The method 1600 then proceeds from step 1610 to step 1602.

Figure 17:
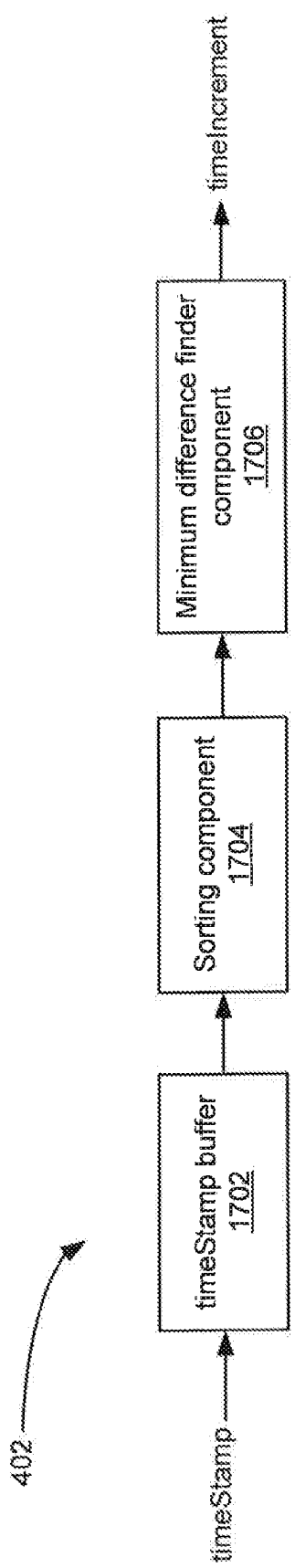
FIG. 17 is a flow diagram of the exemplary timeIncrement calculation component of FIG. 4.

FIG. 17 depicts an illustrative embodiment of the timeIncrement calculation component 402 of FIG. 4. As shown in FIG. 17, the timeIncrement calculation component 402 includes a timeStamp buffer 1702, a sorting component 1704, and a minimum difference finder component 1706. The timeIncrement calculation component 402 is operative to estimate the increment in time that corresponds to the display time between video frames of the input bitstream, and is used to generate an estimate of the video frame rate parameter. It is noted that algorithms for compressing and decompressing video sequences (also referred to herein as "codecs") can have a highly predictive structure. As a result, the actual display order of the video frames can be different from the order in which the video frames were encoded. The timestamps in the encoded bitstreams therefore may not always be monotonically increasing, which can complicate the estimation of the video frame rate parameter. In addition, the presence of packet losses can cause video frame losses, which can further complicate the estimation of the video frame rate parameter. It is also noted that, if the predetermined maximum limit is reached, then the values of the timestamps can rollover.

The operation of the timeIncrement calculation component 402, as illustrated in FIG. 17, is further described with reference to the following illustrative example. In this example, it is assumed that the time increment between video frames in the input bitstream is constant when the video frames are in the display order. For example, when transporting an input bitstream encoded according to the H.264 coding format over RTP, the standard clock frequency is typically 90 KHz. If the input bitstream is transported at 30 frames per second (fps), then the time increment between the video frames will be 3000. Because it is assumed that the time increment between the video frames is constant when the video frames are in the display order, the time increment between the video frames should remain at 3000. However, if the input bitstream is received in the coded order, and not in the display order, then the timestamps received in the coding order may not be monotonically increasing. To address this situation, the timeStamp buffer 1702 is operative to collect timestamps over a window of M frames. For example, the number, M, may be equal to 30, or any other suitable number. Further, the sorting component 1704 is operative to sort the collected timestamps so that they are monotonically increasing. As a result, when there are no packet losses, the time increments between the video frames should always be constant. It is noted that, in some cases, the time increments may be larger when there are packet losses. The minimum difference finder component 1706 is operative to determine, using the sorted timestamps provided by the sorting component 1704, the minimum timestamp difference in the window of M video frames, thereby providing an indication of the timeIncrement between the video frames.

Figure 18:
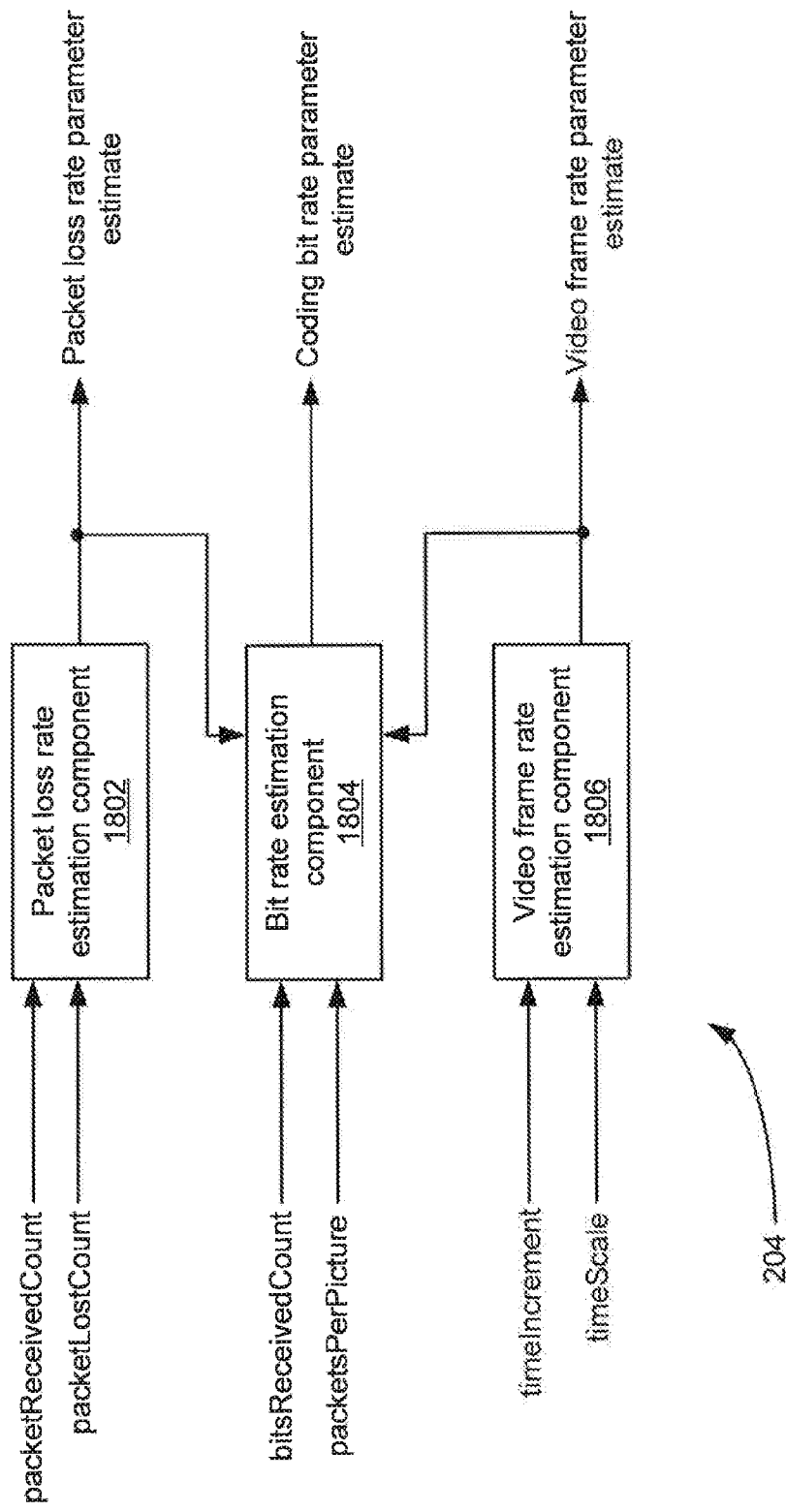
FIG. 18 is a block diagram of the exemplary parameter estimation sub-component of FIG. 2, including an exemplary packet loss rate estimation component, an exemplary bit rate estimation component, and an exemplary video frame rate estimation component.

FIG. 18 depicts an illustrative embodiment of the parameter estimation sub-component 204 of FIG. 2. As shown in FIG. 18, the parameter estimation sub-component 204 includes a packet loss rate estimation component 1802, a bit rate estimation component 1804, and a video frame rate estimation component 1806. The packet loss rate estimation component 1802 is operative to receive indications of the packetReceivedCount and the packetLostCount from the feature collection component 202 (see FIG. 2), and to generate an estimate of the packet loss rate parameter for a respective segment of N video frames. In accordance with the illustrative embodiment of FIG. 18, the packet loss rate estimation component 1802 generates the estimate of the packet loss rate parameter (also referred to herein as a/the "PacketLossRate") as the ratio of lost packets to total packets, in which the total packets correspond to the number of received packets, namely, the packetReceivedCount, plus the number of lost packets, namely, the packetLostCount, as shown in equation (3) below.

$$\text{PacketLossRate} = \text{packetLostCount}/(\text{packetLostCount} + \text{packetReceivedCount}) \qquad (3)$$

In accordance with the illustrative embodiment of FIG. 18, the video frame rate estimation component 1806 receives indications of the timeIncrement, and the timescale, from the feature collection component 202, and generates an estimate of the video frame rate parameter (also referred to herein as a/the "FrameRate") for the respective segment of N video frames. In accordance with the illustrative embodiment of FIG. 18, the video frame rate estimation component 1806 generates the first estimate of the video frame rate parameter (FrameRate) as the ratio of the timescale to the timeIncrement, as shown in equation (4) below.

$$\text{FrameRate} = \text{timeScale}/\text{timeIncrement} \qquad (4)$$

Further, the video frame rate estimation component 1806 generates the second estimate of the video frame rate parameter (FrameRate), in accordance with equation (5) below, $$\text{FrameRate} = (\text{prevFrameRate} + \text{currFrameRate})/2, \qquad (5)$$

in which "prevFrameRate" corresponds to the previous estimate of the video frame rate parameter, and "currFrameRate" corresponds to the current estimate of the video frame rate parameter. Moreover, the video frame rate estimation component 1806 generates subsequent estimates of the video frame rate parameter (FrameRate), in accordance with equation (6) below.

$$\text{FrameRate} = 0.8 * \text{prevFrameRate} + 0.2 * \text{currFrameRate} \qquad (6)$$

In addition, the bit rate estimation component 1804 receives indications of the bitsReceivedCount and the packetsPerPicture from the feature collection component 202, the estimate of the packet loss rate parameter from the packet loss rate estimation component 1802, and the estimate of the video frame rate parameter from the video frame rate estimation component 1806, and generates an estimate of the coding bit rate parameter for the respective segment of N video frames. It is noted that the generation of the estimate of the coding bit rate parameter can be made more complicated in the presence of packet losses. In this case, bits that are lost can be estimated based on the bits that have been received, along with some additional information obtained from the received packets.

Figure 19:
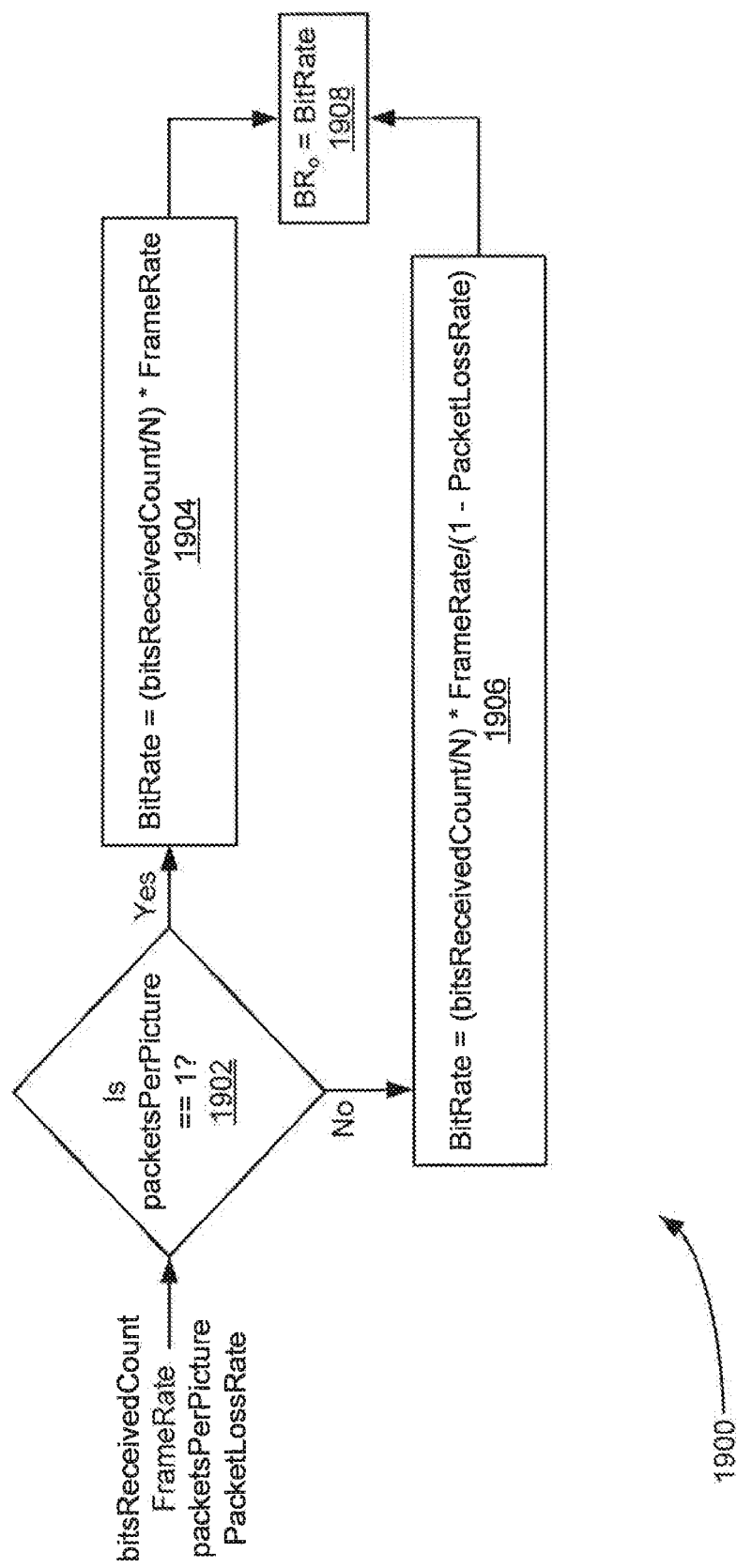
FIG. 19 is a flow diagram of an exemplary method of operating the exemplary bit rate estimation component of FIG. 18.

FIG. 19 depicts an illustrative method 1900 of operating the bit rate estimation component 1804 of FIG. 18. In accordance with the illustrative method of FIG. 19, in the case of no packet losses, the coding bit rate parameter (also referred to herein as a/the "BitRate") can be estimated using equation (7) below, $$\text{BitRate} = (\text{bitsReceivedCount}/N) * \text{FrameRate}, \qquad (7)$$

in which "N" is the number of video frames in the segment. As shown in equation (7), the number of bits received in a segment (bitsReceivedCount) is divided by the number of video frames, N, per segment to obtain the number of bits per frame, which is then multiplied by the video frame rate (the FrameRate, in units of frames per second (fps)), to yield the estimate of the coding bit rate parameter (the BitRate, in units of bits per second (bps)).

It is noted that, if there are packet losses and the packetsPerPicture is equal to 1, then the estimation of the BitRate can again be performed using equation (7) above, in which case the number, N, reflects the number of video frames received. If there are packet losses, and the packetsPerPicture is greater than 1, then the BitRate can be estimated using equation (8) below.

$$\text{BitRate} = (\text{bitsReceivedCount}/N) * \text{FrameRate}/(1 - \text{PacketLossRate}) \qquad (8)$$

It is noted that the method 1900 of FIG. 19 receives, as inputs, the bitsReceivedCount, the packetsPerPicture, the FrameRate, and the PacketLossRate. Moreover, the method 1900 generates, as an output, the value of the output BitRate (also referred to herein as "$BR_o$"). As depicted in step 1902, a determination is made as to whether the packetsPerPicture is equal to 1. If the packetsPerPicture is equal to 1, then the BitRate is estimated using equation (7) above, as depicted in step 1904. If the packetsPerPicture is not equal to 1, then the BitRate is estimated using equation (8) above, as depicted in step 1906. If step 1904 is executed following the execution of step 1902, then the method 1900 proceeds from step 1904 to step 1908. Similarly, if step 1906 is executed following the execution of step 1902, then the method 1900 proceeds from step 1906 to step 1908, in which the output BitRate ($BR_o$) is made equal to BitRate, and the value of the $BR_o$ is generated as the output.

As discussed above with reference to FIG. 1, the parameter estimation component 104 is ioperative to provide indications of the estimate of the packet loss rate parameter (PacketLossRate), the estimate of the video frame rate parameter (FrameRate), and the estimate of the coding bit rate parameter (BitRate), to the video quality estimation component 106, which uses the respective video quality parameter estimates to generate an estimate of the perceptual quality of the video that is delivered to the end user. By generating these estimates of the PacketLossRate, the FrameRate, and the BitRate from the input bitstream as it is being received, the perceptual quality monitoring system 100 of FIG. 1 can provide the functionality of a QoE monitoring tool.

Having described the above illustrative embodiments of the presently disclosed systems and methods of perceptual quality monitoring of video information, communications, and entertainment, other alternative embodiments or variations may be made/practiced. For example, by providing a normalized estimate of the coding bit rate parameter to the video quality estimation component 106, taking into account the complexities of the video frames included in the input bitstream, the perceptual quality monitoring system 100 can be made to generate estimates of the perceptual quality of video delivered to the end user with increased accuracy.

Figure 20:
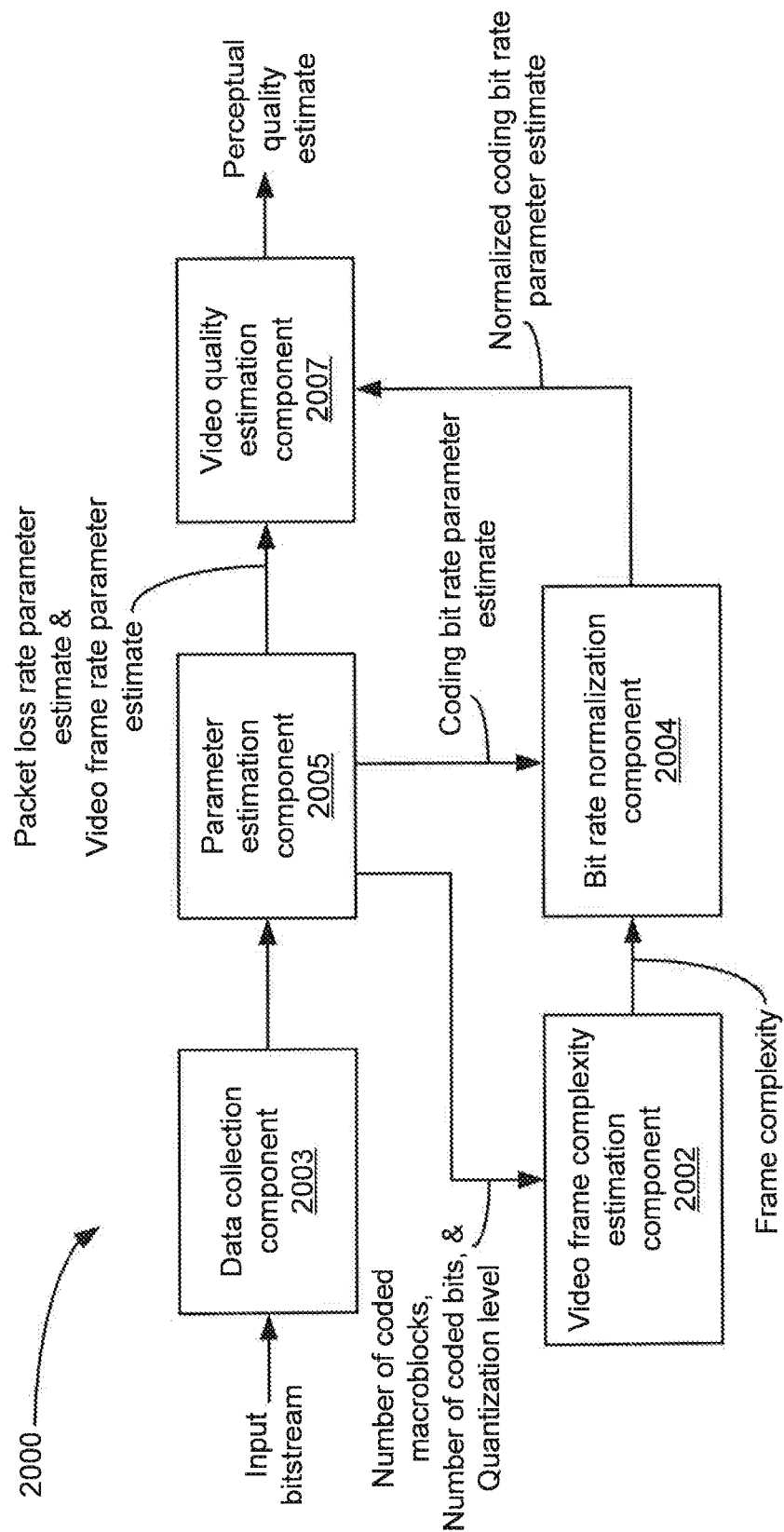
FIG. 20 is a block diagram of an exemplary alternative embodiment of the perceptual quality monitoring system of FIG. 1, including an exemplary video frame complexity estimation component, and an exemplary bit rate normalization component.

FIG. 20 depicts an illustrative embodiment of an exemplary perceptual quality monitoring system 2000, in accordance with the present application. In accordance with the illustrative embodiment of FIG. 20, to increase the accuracy of estimates of the perceptual quality of video delivered to the end user, the perceptual quality monitoring system 2000 is operative to replace the estimate of the coding bit rate parameter (BitRate) generated by the bit rate estimation component 1804 (see FIG. 18) with a normalized estimate of the coding bit rate parameter, taking into account the complexities of the video frames included in the input bitstream. As shown in FIG. 20, the perceptual quality monitoring system 2000 includes a data collection component 2003, a parameter estimation component 2005, and a video quality estimation component 2007. The perceptual quality monitoring system 2000 further includes a video frame complexity estimation component 2002, and a bit rate normalization component 2004. In accordance with the illustrative embodiment of FIG. 20, the data collection component 2003 is operative to receive an input bitstream including a plurality of video frames, and to provide the input bitstream to the parameter estimation component 2005. The parameter estimation component 2005 is operative to extract, for each video frame in the input bitstream, the number of coded macroblocks, the number of coded bits, and the quantization level, and to provide indications of the number of coded macroblocks, the number of coded bits, and the quantization level to the video frame complexity estimation component 2002. Using the number of coded macroblocks, the number of coded bits, and the quantization level, the video frame complexity estimation component 2002 generates an estimate of the complexity of the respective video frame (also referred to herein as a/the "frame complexity"), generates an aggregated frame complexity over N (e.g., N may be equal to 30 or any other suitable number) video frames, and provides an indication of the frame complexity of the respective N video frames to the bit rate normalization component 2004. It is noted that the frame complexity of the respective N video frames represents the complexity of the video content.

In addition, the parameter estimation component 2005 is operative to generate estimates of one or more video quality parameters associated with the input bitstream, including, but not limited to, an estimate of the packet loss rate parameter, an estimate of the video frame rate parameter, and an estimate of the coding bit rate parameter. The parameter estimation component 2005 provides indications of the estimate of the packet loss rate parameter and the estimate of the video frame rate parameter to the video quality estimation component 2007. Further, the parameter estimation component 2005 provides an indication of the estimate of the coding bit rate parameter to the bit rate normalization component 2004. Using the frame complexity of the respective N video frames and the coding bit rate parameter estimate, the bit rate normalization component 2004 generates a normalized estimate of the coding bit rate parameter, and provides an indication of the normalized estimate of the coding bit rate parameter to the video quality estimation component 2007. In one or more alternative embodiments, the bit rate normalization component 2004 may generate a normalized estimate of the coding bit rate parameter by normalizing the bit count of each video frame by the corresponding frame complexity, and aggregating over the respective N video frames. In one or more further alternative embodiments, the video frame complexity estimation component 2002 may provide the indication of the frame complexity of the respective N video frames to the parameter estimation component 2005, and the parameter estimation component 2005 may generate the normalized estimate of the coding bit rate parameter using the frame complexity of the respective N video frames and the coding bit rate parameter estimate, and provide the indication of the normalized estimate of the coding bit rate parameter to the video quality estimation component 2007. Using the estimate of the packet loss rate parameter, the estimate of the frame rate parameter, and the normalized estimate of the coding bit rate parameter, the video quality estimation component 2007 generates an estimate of the perceptual quality of the video delivered to the end user with increased accuracy.

The operation of the video frame complexity estimation component 2002 (see FIG. 20) will be further described with reference to the following illustrative analysis, which is applicable to encoded input video bitstreams compressed according to the H.264 coding format (also known as the "MPEG-4 advanced video coding (AVC) format"), the MPEG-2 coding format, the MPEG-4 coding format, the VC-1 coding format, the VP8 coding format, or any other suitable coding format, including, but not limited to, those relating to high efficiency video coding (HEVC). In this illustrative analysis, the complexity of a video frame (also referred to herein as a/the "picture") can be viewed as a combination of the spatial complexity of the picture, and the temporal complexity of the video scene in which that picture is found. Pictures with more detail generally have a higher spatial complexity than pictures with little detail. Further, video scenes with a high degree of motion generally have a higher temporal complexity than video scenes with little or no motion. Moreover, for a typical video compression process using a fixed quantization level, video frames with higher complexity generally yield more bits. Similarly, for a typical video compression process using a fixed target number of bits, video frames with higher complexity generally result in larger quantization step sizes. Accordingly, the video frame complexity estimation component 2002 (see FIG. 20) can be configured to generate an estimate of the complexity of a video frame based on the number of coded bits, the number of macroblocks, the number of coded macroblocks, and the quantization level, for the respective video frame.

In the following illustrative analysis, a matrix of actual quantization step sizes is referred to as "$M_{Q\_input}$" and a matrix of reference quantization step sizes is referred to as "$M_{Q\_ref}$". Further, for a given video frame, the number of bits that would have been used at a reference quantization level (also referred to herein as the "bits($M_{Q\_ref}$)") can be estimated by the actual bits used to encode the video frame (also referred to herein as the "bits($M_{Q\_input}$)"), and the quantization step-size matrices $M_{Q\_input}$ and $M_{Q\_ref}$ as shown in equation (9) below.

$$\text{bits}(M_{Q\_ref}) \approx \frac{\sum_{i=0}^{N-1} w_i \times m_{Q\_input\_i}}{\sum_{i=0}^{N-1} w_i \times m_{Q\_ref\_i}} \times \text{bits}(M_{Q\_input}) \quad (9)$$

It is noted that the dimensions of the quantization step-size matrices $M_{Q\_input}$ and $M_{Q\_ref}$ can be either 4×4 if the H.264 coding format is employed, or 8×8 if the MPEG-2 or MPEG-4 coding format is employed. Each quantization step-size matrix $M_{Q\_input}$ or $M_{Q\_ref}$ can therefore have either 64 or 16 elements. In equation (9) above, the number of elements in the quantization step-size matrices $M_{Q\_input}$ and $M_{Q\_ref}$ is denoted by the variable, N. It is further noted that, for binary encoding, the discrete cosine transform (DCT) coefficients are arranged in a 1-dimensional array following a zigzag scanning order, from the lowest spatial frequency to the highest spatial frequency. Therefore, the quantization step-size matrix, $M_{Q\_input}$ or $M_{Q\_ref}$, can also be arranged in a 1-dimensional array, following the same zigzag scanning order, with the quantization step-sizes of the low frequency DCT coefficients disposed in front of the quantization step-sizes of the high frequency DCT coefficients. Each element of the quantization step-size matrices $M_{Q\_input}$ and $M_{Q\_ref}$ is referred to herein as "$m_Q$."

To evaluate the effects of the quantization step size matrices $M_{Q\_input}$ and $M_{Q\_ref}$, a weighted sum of all of the elements, $m_Q$, is employed, in which the weight, $w_i$, for each element, i, depends on the corresponding frequency. It is noted that, in natural imagery, energy tends to be concentrated in the lower frequencies. The quantization step sizes in the lower frequencies therefore tend to have more impact on the resulting number of bits. Accordingly, the weighted sums employed in equation (9) above allow the lower frequencies to be weighted more heavily than the higher frequencies.

In some cases, different macroblocks can have different associated quantization step-size matrices. The quantization step size matrices $M_{Q\_input}$ and $M_{Q\_ref}$ as specified in equation (9) above, are therefore averaged over all of the macroblocks in the video frame. It is noted that some video compression standards allow some macroblocks to be skipped. This usually occurs either when macroblock data can be well predicted from previously coded data, or when there are not enough target bits to code these macroblocks. Accordingly, the quantization step-size matrices $M_{Q\_input}$ and $M_{Q\_ref}$ as specified in equation (9) above, are averaged over all of the coded macroblocks in the video frame, specifically, all of the coded macroblocks in the video frame that have not been skipped.

In accordance with this illustrative analysis, equation (9) above can be simplified by considering binary weights, $w_i$, for each element, i. For example, such binary weights associated with the step-sizes for the low frequency DCT coefficients can be assigned a value of 1, and such binary weights associated with the step-sizes for the high frequency DCT coefficients can be assigned a weight of 0. Because the DCT coefficients are arranged in a 1-dimensional array following the zigzag scanning order, which is generally ordered from low frequency to high frequency, and the quantization step-size matrix, $M_{Q\_input}$ or $M_{Q\_ref}$ is also arranged in a 1-dimensional array following the same zigzag scanning order with the quantization step-sizes of the low frequency DCT coefficients disposed in front of the quantization step-sizes of the high frequency DCT coefficients, equation (9) above can be rewritten as equation (10) below.

$$\text{bits}(M_{Q\_ref}) \approx \frac{\sum_{i=0}^{K-1} m_{Q\_input\_i}}{\sum_{i=0}^{K-1} m_{Q\_ref\_i}} \times \text{bits}(M_{Q\_input}) \quad (10)$$

It is noted that, for quantization step-size matrices having dimensions 8×8, the first 16 elements typically quantize the low frequency DCT coefficients, and therefore the variable, K, in equation (10) above, can be set to 16. Alternatively, for quantization step-size matrices having dimensions 4×4, the first 8 elements typically quantize the low frequency DCT coefficients, and therefore the variable, K, in equation (10) above, can be set to 8.

For purposes of illustration, assuming a fixed reference quantization step size matrix, $M_{Q\_ref}$ and using "Q" to represent "Q_input," a quantization complexity factor (also referred to herein as "fn(Q)") can be defined, as shown in equation (11) below.

$$fn(Q) = \frac{\sum_{i=0}^{K-1} m_{Q\_i}}{\sum_{i=0}^{K-1} m_{Q\_ref\_i}} \quad (11)$$

Using equation (11) above, equation (10) above can be rewritten as equation (12), as follows.

$$\text{bits}(M_{Q\_ref}) \approx fn(Q) \times \text{bits}(M_Q) \quad (12)$$

Moreover, to derive an estimate of the frame complexity that is resolution independent, the estimate of the number of bits necessary at the reference quantization level, bits($M_{Q\_ref}$), as shown in equation (12) above, can be normalized by the number of 16×16 macroblocks in the video frame (referred to herein as "frame_num_MB"). In this way, an estimate of the number of bits per macroblock can be obtained at the reference quantization level.

In addition, the resulting estimate of the frame complexity (frame_complexity) can be expressed as equation (13) below.

$$\text{frame\_complexity} = \frac{\text{bits}(M_{Q\_ref})}{\text{frame\_num\_MB}} \approx \frac{fn(Q) \times \text{bits}(M_Q)}{\text{frame\_num\_MB}} \quad (13)$$

Accordingly, in accordance with this illustrative analysis, the video frame complexity estimation component 2002 (see FIG. 20) can generate estimates of the complexities of the video frames (frame_complexity) included in the input bitstream, and provide indications of the frame complexities to the bit rate normalization component 2004 (see FIG. 20).

As discussed above, such generation of frame complexity estimates, as performed by the video frame complexity estimation component 2002, is applicable to any suitable video coding format, including, but not limited to, the H.264 coding format, the MPEG-2 coding format, and the MPEG-4 coding format. It is noted that the video frame complexity estimation component 2002 may employ different quantization step-size matrices for different ones of the various video coding formats, as described below with reference to the H.264 coding format, and the MPEG-2 coding format.

When the H.264 coding format is employed, the video frame complexity estimation component 2002 can use a quantization parameter (also referred to herein as "QP") to determine the quantization level. In this case, the QP can take on one of 52 different values, and can be used to derive the quantization step size, which, in turn, can be combined with a scaling matrix to derive a quantization step-size matrix. It is noted that an increase of 1 in the QP typically results in a corresponding increase in the quantization step size of about 12%. This change in the quantization step size typically causes a corresponding increase in the sum of the first 8 elements in the quantization step-size matrix by a factor of about 1.1, and a corresponding decrease in the number of frame bits by a factor of about 1/1.1. Further, a decrease of 1 in the QP typically causes a decrease of about 12% in the quantization step size, a corresponding decrease in the sum of the first 8 elements in the quantization step size matrix by a factor of about 1/1.1, and an increase in the number of frame bits by a factor of about 1.1.

When calculating the quantization complexity factor, fn(Q) (see equation (11) above) for the H.264 coding format, the reference QP used to represent the average quality is 26 (the midpoint of the 52 possible QP values). The quantization complexity factor, fn(Q), can therefore be rewritten as equation (14) below for the H.264 coding format.

$$fn(Q) = \frac{\sum_{i=0}^{7} m_{frame\_QP\_avg\_i}}{\sum_{i=0}^{7} m_{QP26\_i}} = \text{pow}(1.1, frame\_QP\_avg - 26) \quad (14)$$

With regard to the denominator of equation (14) above, the reference quantization step-size matrix is obtained using the QP of 26. Further, the numerator of equation (14) above represents the average of all of the quantization step-size matrices in the video frame. If the average QP in the video frame is 26, then the ratio of the numerator to the denominator in equation (14) above becomes unity. Moreover, if the average QP in the video frame is 27, then the ratio of the numerator to the denominator in equation (14) above is 1.1, which is an increase by a factor of 1.1 from unity. It is noted that each increase in the QP by 1 increases the ratio of the numerator to the denominator in equation (14) above by another factor of 1.1. The ratio of the numerator to the denominator in equation (14) above can therefore be written using a power function (pow), as shown in equation (14) above. Using the quantization complexity factor, fn(Q), as expressed in equation (14) above for the H.264 coding format, and the number of macroblocks in the video frame (frame_num_MB), the video frame complexity estimation component 2002 (see FIG. 20) can generate an estimate of the complexity of that video frame (frame_complexity), in accordance with equation (13) above.

When the MPEG-2 coding format is employed, the parameters, quant_scale_code and q_scale_type, are used to specify the quantization level. Specifically, the quant_scale_code parameter is used to specify another parameter, quant_scale, which is weighted by a weighting matrix, W, to obtain the quantization step size matrix, M, as shown in equation (15) below.

$$M = \text{quant\_scale} * W \quad (15)$$

It is noted that the mapping of the parameter, quant_scale_code, to the parameter, quant_scale, can be linear or non-linear, as specified by the parameter, q_scale_type.

The MPEG-2 coding format typically employs an 8×8 discrete cosine transform (DCT), and a quantization step-size matrix having dimensions 8×8, resulting in 64 quantization step-sizes for 64 DCT coefficients. As discussed above, the low frequency DCT coefficients typically contribute more to the total number of coded bits. Accordingly, the first 16 quantization step-sizes for the first 16 DCT coefficients are employed in the summations of equation (11) above, as shown in equation (16) below.

$$fn(Q) = \frac{\sum_{i=0}^{15} m_{Q\_input\_i}}{\sum_{i=0}^{15} m_{Q\_ref\_i}} = \frac{\sum_{i=0}^{15} w_{input\_i} \times \text{quant\_scale}_{input\_i}}{\sum_{i=0}^{15} w_{ref\_i} \times \text{quant\_scale}_{ref\_i}} \quad (16)$$

In the MPEG-2 coding format, the parameter, quant_scale_code, typically has one value for each macroblock, ranging between 1 and 31. Further, the parameter, quant_scale_code, is the same at each quantization step-size position in the 8×8 quantization step-size matrix. The parameters, quant_scale$_{input}$ and quant_scale$_{ref}$, in equation (16) above, are therefore independent of i, and can be factored out of the respective summations. Moreover, the value, 16, can be employed as the reference quant_scale_code parameter to represent the average quantization. It is noted that the notation, quant_scale[16], is used herein to refer to the value of the parameter, quant_scale, when the parameter, quant_scale_code, is equal to 16. In addition, for the input bitstream, the average quant_scale_code for each video frame is calculated over the coded macroblocks, and the resulting calculation is referred to herein as "quant_scale$_{input\_avg}$."

It is further noted that different weighting matrices, W, are typically used for intra-coded blocks and non-intra coded blocks to obtain the quantization step size matrix, M. For example, default matrices defined in accordance with the MPEG-2 video compression standard, or any other suitable matrices, may be employed. The MPEG software simulation group (MSSG) has developed a default weighting matrix for intra-coded blocks, as shown in TABLE I below.

TABLE I

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

The MSSG has also developed a non-default weighting matrix for non-intra-coded blocks, as shown in TABLE II below.

TABLE II

| 16 | 17 | 18 | 19 | 20 | 21 | 22 | 23 |
|----|----|----|----|----|----|----|----|
| 17 | 18 | 19 | 20 | 21 | 22 | 23 | 24 |
| 18 | 19 | 20 | 21 | 22 | 23 | 24 | 25 |
| 19 | 20 | 21 | 22 | 23 | 24 | 25 | 26 |
| 20 | 21 | 22 | 23 | 24 | 25 | 26 | 27 |
| 21 | 22 | 23 | 24 | 25 | 26 | 27 | 28 |
| 22 | 23 | 24 | 25 | 26 | 27 | 28 | 29 |
| 23 | 24 | 25 | 26 | 27 | 28 | 29 | 30 |

The quantization complexity factor, fn(Q), as expressed in equation (16) above, can be rewritten, as shown in equation (17) below, using the MSSG weighting matrices as the reference in the denominator of equation (17).

$$fn(Q) = \frac{\text{quant\_scale}_{input\_avg} \times \sum_{i=0}^{15} w_{input\_i}}{\text{quant\_scale}[16] \times \sum_{i=0}^{15} w_{ref\_i}} \quad (17)$$

Equation (17) above can be simplified by setting the parameter, quant_scale[16], to 32 for linear mapping, and to 24 for non-linear mapping. Further, because the sum of the first 16 MSSG weighting matrix elements for non-intra coded blocks is 301, and the sum of the first 16 MSSG weighting matrix elements for intra-coded blocks is 329, the denominator of equation (17) above is a constant. Accordingly, the quantization complexity factor, fn(Q), as expressed in equation (17) above, can be rewritten, as shown in equation (18) below, in which "fnD" is defined by equation (19) below.

$$fn(Q) = \frac{1}{fnD}\left(\text{quant\_scale}_{input\_avg} \times \sum_{i=0}^{15} w_{input\_i}\right) \quad (18)$$

$$fnD = \begin{cases} 9632, & \text{linear/non-intra} \\ 7224, & \text{non-linear/non-intra} \\ 10528, & \text{linear/intra} \\ 7896, & \text{non-linear/intra} \end{cases} \quad (19)$$

Using the quantization complexity factor, fn(Q), as expressed in equation (18) above for the MPEG-2 coding format, and the number of macroblocks in the video frame (frame_num_MB), the video frame complexity estimation component 2002 (see FIG. 20) can generate an estimate of the complexity of that video frame (frame_complexity), in accordance with equation (13) above.

In accordance with the illustrative embodiment of FIG. 20, the bit rate normalization component 2004 can generate a normalized estimate of the coding bit rate parameter (also referred to herein as "bitrate_norm") using the frame complexity of a respective video frame, and provide the normalized estimate of the coding bit rate parameter to the video quality estimation component 2007, thereby allowing the perceptual quality monitoring system 2000 to generate estimates of the perceptual quality of video delivered to the end user with increased accuracy.

The operation of the bit rate normalization component 2004 (see FIG. 20) will be further described with reference to the following illustrative examples. In a first illustrative example, the bit rate normalization component 2004 is operative to receive the estimate of the coding bit rate parameter (also referred to herein as a/the "bitrate") from the parameter estimation component 2005, to receive the estimate of the frame complexity (frame_complexity) for the respective video frame from the video frame complexity estimation component 2002, to average the frame complexity over N frames using a sliding window, and to generate the normalized estimate of the coding bit rate parameter (bitrate_norm) using the bitrate and the average frame_complexity, as shown in equation (20) below. It is noted that the "frame_complexity" in equation (20) below corresponds to the average frame complexity.

$$\text{bitrate\_norm} = (bitrate/\text{frame\_complexity}) \quad (20)$$
$$= \frac{bitrate}{\left(\frac{\text{bits}(M_Q)}{\text{frame\_num\_MB}}\right) * fn(Q)} \approx \frac{C}{fn(Q)}$$

It is noted that, because the frame bits (bits($M_{Q\_ref}$), bits ($M_{Q\_input}$)) are used to calculate the estimate of the frame_complexity (see equation (13) above), such normalization of the estimate of the coding bit rate parameter, as shown in equation (20) above, will cause the bitrate to be cancelled, leaving the quantization step-size matrix, $M_Q$. It is further noted with reference to equation (20) above that the frame_num_MB, which represents the spatial resolution of the respective video frame, corresponds to the constant number, C, of macroblocks in the video frame. Accordingly, using the estimate of the PacketLossRate, the estimate of the FrameRate, and the normalized estimate of the coding bit rate parameter (bitrate_norm), the video quality estimation component 2007 can generate an estimate of the perceptual quality of the video delivered to the end user that is based on the quantization step-size matrices and the video frame resolution, rather than the actual bitrate of the input bitstream.

In a second illustrative example, the bit rate normalization component 2004 is operative to receive the estimate of the coding bit rate parameter (bitrate) from the parameter estimation component 2005, to receive the quantization complexity factor (fn(Q)) for the respective video frames from the video frame complexity estimation component 2002, and to generate the normalized estimate of the coding bit rate parameter (bitrate_norm) using the bitrate and the fn(Q), as shown in equation (21) below.

$$\text{bitrate\_norm} = \frac{bitrate}{fn(Q)} \quad (21)$$

It is noted that the quantization complexity factor (fn(Q)) can be calculated as shown in equation (14) above for the H.264 coding format, and as shown in equation (18) above for the MPEG-2 coding format. It is further noted that, for compressed video at the same bitrate, simple video will have high quality, and therefore its fn(Q) will be smaller, whereas the fn(Q) for complex video will be larger. Accordingly, normalizing the bitrate with the appropriate fn(Q), as shown in equation (21) above, will reflect the bitrate at constant quality.

In a third illustrative example, the video frame complexity estimation component 2002 estimates the complexity of the respective video frame (frame_complexity) based on the number of macroblocks that are coded (not skipped; also referred to herein as "num_coded_MB"), the number of macroblocks in the respective video frame (frame_num_MB), and the quantization complexity factor (fn(Q)). Further, the bit rate normalization component 2004 aggregates the frame complexity over N video frames in a sliding window to obtain the average frame complexity, and generates the normalized estimate of the coding bit rate parameter (bitrate_norm), as shown in equation (22) below. It is noted that the "frame_complexity" in equation (22) below corresponds to the average frame complexity.

$$\text{bitrate\_norm} = (bitrate/\text{frame\_complexity}) \quad (22)$$
$$= \frac{bitrate}{\left(\frac{\text{num\_coded\_MB}}{\text{frame\_num\_MB}}\right) * fn(Q)}$$

Using the normalized estimate of the coding bit rate parameter (bitrate_norm), as expressed in equation (20), equation (21), or equation (22) above, the video quality estimation component 2007 within the perceptual quality monitoring system 2000 (see FIG. 20) can generate estimates of the perceptual quality of the video delivered to the end user with increased accuracy.

It is noted that the operations performed by the above-described illustrative embodiments are purely exemplary and imply no particular order. Further, these operations can be used in any sequence when appropriate and/or can be partially used. With the above embodiments in mind, it should be understood that the above-described systems and methods can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared, or otherwise manipulated.

Moreover, any of the operations described herein that form part of the above-described systems and methods are useful machine operations. The presently disclosed systems relate to devices or apparatuses for performing these operations. The devices or apparatuses can be specially constructed for the required purpose, or can be a general-purpose computer selectively activated or configured by a computer program stored in the computer. In particular, various general-purpose machines can be used with computer programs written in accordance with the teachings herein, or it may be more convenient to construct a specialized apparatus to perform the required operations.

The above-described systems and methods can be embodied at least in part as computer readable code on a computer readable medium. The computer readable medium is any data storage device that can store data, which can thereafter be read by a computer system. Examples of a computer readable medium include hard drives, read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method of monitoring a perceptual quality of video in a perceptual quality monitoring system, the perceptual quality monitoring system including a data collection component, a parameter estimation component, and a video quality estimation component, the method comprising the steps of:
receiving, at the data collection component, an encoded input video bitstream containing predetermined information and at least one video frame;
generating, by the parameter estimation component from at least some of the predetermined information contained in the encoded input video bitstream, a plurality of video quality parameter estimates including at least a frame rate parameter estimate and a packet loss rate parameter estimate;
generating, by the parameter estimation component, a coding bit rate parameter estimate as a function of the frame rate parameter estimate and the packet loss rate parameter estimate, the perceptual quality monitoring system further including a video frame complexity estimation component;
generating, by the video frame complexity estimation component, an estimate of the complexity of the at least one video frame using at least some of the predetermined information;
generating, by the parameter estimation component, a normalized version of the coding bit rate parameter estimate using the estimate of the complexity of the at least one video frame;
providing, by the parameter estimation component, indications of the normalized version of the coding bit rate parameter estimate, the frame rate parameter estimate, and the packet loss rate parameter estimate to the video quality estimation component; and
generating, by the video quality estimation component, an estimate of the perceptual quality of the video using at least the normalized version of coding bit rate parameter estimate, the frame rate parameter estimate, and the packet loss rate parameter estimate.

2. The method of claim 1 wherein the generating of the plurality of video quality parameter estimates includes extracting, by the parameter estimation component, the predetermined information from the encoded input video bitstream.

3. The method of claim 2 wherein the encoded input video bitstream further includes a plurality of video frames, and wherein the predetermined information includes at least one or more of a number of bits received, a number of packets received, and a number of packets lost, for a predetermined number of the plurality of video frames.

4. The method of claim 3 wherein the generating of the plurality of video quality parameter estimates includes calculating, by the parameter estimation component, at least one or more of the number of bits received, the number of packets received, and the number of packets lost, for the predetermined number of the plurality of video frames using a sliding window.

5. The method of claim 1 wherein the generating of the plurality of video quality parameter estimates includes calculating, by the parameter estimation component, one or more of:
a number of packets received in a predetermined number of video frames;
a number of packets received per video frame;
a number of bits received in the predetermined number of video frames;
a number of packets lost in the predetermined number of video frames;
a time interval between two adjacent video frames; and
a reference clock frequency for a predetermined coding format.

6. The method of claim 5 wherein the predetermined coding format is one of an H.264 coding format, an MPEG-2 coding format, an MPEG-4 coding format, a VC-1 coding format, and a VP8 coding format.

7. The method of claim 5 wherein the parameter estimation component includes a packet loss rate estimation component, and wherein the generating of the plurality of video quality parameter estimates includes generating, by the packet loss rate estimation component, the packet loss rate parameter estimate using the number of packets received and the number of packets lost.

8. The method of claim 5 wherein the parameter estimation component includes a frame rate estimation component, and wherein the generating of the plurality of video quality parameter estimates includes generating, by the frame rate estimation component, the frame rate parameter estimate using the time interval and the reference clock frequency.

9. The method of claim 5 wherein the parameter estimation component includes a coding bit rate estimation component, and wherein the generating of the coding bit rate parameter estimate includes generating, by the coding bit rate estimation component, the coding bit rate parameter estimate using the number of bits received and the number of packets received.

10. The method of claim 1 wherein the generating of the estimate of the complexity of the at least one video frame includes estimating, by the video frame complexity estimation component, a number of bits for use at a reference quantization level.

11. The method of claim 1 wherein the generating of the estimate of the complexity of the at least one video frame includes generating, by the video frame complexity estimation component, the estimate of the complexity of the at least one video frame using a plurality of actual bits for encoding the at least one video frame, and a quantization complexity factor.

12. A method of monitoring a perceptual quality video in a perceptual quality monitoring system, the perceptual quality monitoring system including a data collection component, a parameter estimation component, and a video quality estimation component, the method comprising the steps of:
  receiving, at the data collection component, an encoded input video bitstream containing predetermined information and at least one video frame;
  generating, by the parameter estimation component from at least some of the predetermined information contained in the encoded input video bitstream, a plurality of video quality parameter estimates including at least a frame rate parameter estimate and a packet loss rate parameter estimate;
  generating, by the parameter estimation component, a coding bit rate parameter estimate as a function of the frame rate parameter estimate and the packet loss rate parameter estimate, the perceptual quality monitoring system further including a video frame complexity estimation component;
  generating, by the video frame complexity estimation component, an estimate of the complexity of the at least one video frame using at least some of the predetermined information, the generating of the estimate of the complexity of the at least one video frame including:
    generating the estimate of the complexity of the at least one video frame using a plurality of actual bits for encoding the at least one video frame, and a quantization complexity factor; and
    generating the estimate of the complexity of the at least one video frame based on a number of coded macroblocks, a number of macroblocks in the respective video frame, and the quantization complexity factor; and
  generating, by the video quality estimation component, an estimate of the perceptual quality of the video using at least the coding bit rate parameter estimate, the frame rate parameter estimate, and the packet loss rate parameter estimate.

13. A method of monitoring a perceptual quality of video in a perceptual quality monitoring system, the perceptual quality monitoring system including a data collection component, a parameter estimation component, and a video quality estimation component, the method comprising the steps of:
  receiving, at the data collection component, an encoded input video bitstream containing predetermined information and at least one video frame;
  generating, by the parameter estimation component from at least some of the predetermined information contained in the encoded input video bitstream, a plurality of video quality parameter estimates including at least a frame rate parameter estimate and a packet loss rate parameter estimate;
  generating, by the parameter estimation component, a coding bit rate parameter estimate as a function of the frame rate parameter estimate and the packet loss rate parameter estimate, the perceptual quality monitoring system further including a video frame complexity estimation component;
  generating, by the video frame complexity estimation component, an estimate of the complexity of the at least one video frame using at least some of the predetermined information, the generating of the estimate of the complexity of the at least one video frame including:
    generating the estimate of the complexity of the at least one video frame using a plurality of actual bits for encoding the at least one video frame, and a quantization complexity factor; and
    determinging the quantization complexity factor using an actual quantization step-size matrix and a reference quantization step-size matrix; and
  generating, by the video quality estimation component, an estimate of the perceptual quality of the video using at least the coding bit rate parameter estimate, the frame rate parameter estimate, and the packet loss rate parameter estimate.

14. The method of claim 13 wherein the perceptual quality monitoring system further includes a coding bit rate normalization component, and wherein the method further includes generating, by the coding bit rate normalization component, a normalized version of the coding bit rate parameter estimate using the estimate of the complexity of the at least one video frame.

15. The method of claim 14 further comprising:
  providing, by the parameter estimation component, indications of the packet loss rate parameter estimate, the frame rate parameter estimate, and the normalized version of the coding bit rate parameter estimate to the video quality estimation component.

16. The method of claim 15 wherein the generating of the estimate of the perceptual quality of the video includes generating, by the video quality estimation component, the estimate of the perceptual quality of the video using the packet loss rate parameter estimate, the frame rate parameter estimate, and the normalized version of the coding bit rate parameter estimate.

17. The method of claim 1 further including implementing, by the video quality estimation component, a predetermined video quality estimation model.

18. The method of claim 17 wherein the predetermined video quality estimation model is a G.1070 video quality estimation model.

19. A system for monitoring a perceptual quality of video, comprising:
  a data collection component, a parameter estimation component, a video frame complexity estimation component, a coding bit rate normalization component, and a video quality estimation component,
  wherein each of the data collection component, the parameter estimation component, the video frame complexity estimation component, the coding bit rate normalization component, and the video quality estimation component is embodied at least in part as computer readable code on a computer readable medium; and
  at least one computerized device operative to execute the computer readable code from the computer readable medium:
    to receive, at the data collection component, an encoded input video bitstream containing at least one video frame and predetermined information;
    to generate, by the parameter estimation component from at least some of the predetermined information contained in the encoded input video bitstream, a plurality of video quality parameter estimates including at least a packet loss rate parameter estimate and a frame rate parameter estimate;

to generate, by the parameter estimation component, a coding bit rate parameter estimate as a function of the frame rate parameter estimate and the packet loss rate parameter estimate;

to generate, by the video frame complexity estimation component, an estimate of the complexity of the at least one video frame using at least some of the predetermined information;

to generate, by the a coding bit rate normalization component, a normalized version of the coding bit rate parameter estimate using the estimate of the complexity of the at least one video frame; and to generate, by the a video quality estimation component, an estimate of the perceptual quality of the video using at least the packet loss rate parameter estimate, the frame rate parameter estimate, and the normalized version of the coding bit rate parameter estimate.

20. The system of claim 19 wherein the parameter estimation component is further operative to generate the coding bit rate parameter estimate using the estimate of the complexity of the at least one video frame.

21. The system of claim 19 wherein the video frame complexity estimation component is further operative to estimate a number of bits for use at a reference quantization level.

22. The system of claim 19 wherein the video frame complexity estimation component is further operative to generate the estimate of the complexity of the at least one video frame using a plurality of actual bits for encoding the at least one video frame, and a quantization complexity factor.

23. The system of claim 22 wherein the video frame complexity estimation component is further operative to generate the estimate of the complexity of the at least one video frame based on a number of coded macroblocks, a number of macroblocks in the respective video frame, and the quantization complexity factor.

24. The system of claim 22 wherein the video frame complexity estimation component is further operative to determine the quantization complexity factor using an actual quantization step-size matrix and a reference quantization step-size matrix.

* * * * *